US009171347B2

(12) United States Patent
Caton et al.

(10) Patent No.: US 9,171,347 B2
(45) Date of Patent: Oct. 27, 2015

(54) SYSTEM AND METHOD FOR ANALYSIS AND AUTHENTICATION OF COVERT SECURITY INFORMATION USING A SMART DEVICE

(71) Applicant: Document Security Systems, Inc., Rochester, NY (US)

(72) Inventors: Michael Caton, Oakfield, NY (US); Michael Roy, Webster, NY (US); Timothy Trueblood, Pittsford, NY (US); Patrick White, Mendon, NY (US); David Wicker, Dansville, NY (US)

(73) Assignee: Document Security Systems, Inc., Rochester, NY (US)

( * ) Notice: Subject to any disclaimer, the term of this patent is extended or adjusted under 35 U.S.C. 154(b) by 234 days.

(21) Appl. No.: 13/838,892

(22) Filed: Mar. 15, 2013

(65) Prior Publication Data

US 2014/0105449 A1    Apr. 17, 2014

Related U.S. Application Data

(60) Provisional application No. 61/719,385, filed on Oct. 27, 2012, provisional application No. 61/713,422, filed on Oct. 12, 2012.

(51) Int. Cl.
| | |
|---|---|
| *G06K 9/00* | (2006.01) |
| *G06T 1/00* | (2006.01) |
| *G06K 19/06* | (2006.01) |
| *G06K 19/14* | (2006.01) |
| *G06F 21/34* | (2013.01) |
| *G06F 21/36* | (2013.01) |
| *H04N 7/14* | (2006.01) |

(52) U.S. Cl.
CPC .............. *G06T 1/0021* (2013.01); *G06F 21/34* (2013.01); *G06F 21/36* (2013.01); *G06K 19/06037* (2013.01); *G06K 19/14* (2013.01)

(58) Field of Classification Search
USPC ......... 382/100, 103, 106, 112–116, 162, 168, 382/173, 181–189, 209, 232, 254, 274, 276, 382/286–298, 305, 312, 243; 283/94; 707/5; 359/19; 348/14.13
See application file for complete search history.

(56) References Cited

U.S. PATENT DOCUMENTS

| 8,542,871 | B2 * | 9/2013 | Voloshynovskiy et al. .... 382/100 |
|---|---|---|---|
| 2007/0164558 | A1 * | 7/2007 | Wicker ........................... 283/94 |
| 2008/0002882 | A1 * | 1/2008 | Voloshynovskyy et al. ... 382/181 |
| 2008/0049281 | A1 * | 2/2008 | MacMaster .................... 359/19 |
| 2009/0300002 | A1 * | 12/2009 | Thomas et al. .................. 707/5 |

* cited by examiner

*Primary Examiner* — Seyed Azarian
(74) *Attorney, Agent, or Firm* — McDonnell Boehnen Hulbert & Berghoff LLP

(57) ABSTRACT

A system and method for hidden security feature detection, analysis and authentication using a smart device is disclosed. The smart device can detect and analyze hidden security features using the camera capability of the smart device to capture a digital image, and then analyze and authenticate that image using a security service including a database of security feature data, processing rules, and other information. The security service can support a variety of smart devices and security features. The smart device includes a security-specific autofocus function that allows the smart device to be positioned within a range of distances and angles from a target document that includes hidden/covert security feature(s). The smart device can display an enhanced image showing the hidden security feature(s) and/or report if the security feature is valid or invalid, along with related information, via beeps, vibration, display, text messaging, or other reporting capabilities.

19 Claims, 15 Drawing Sheets

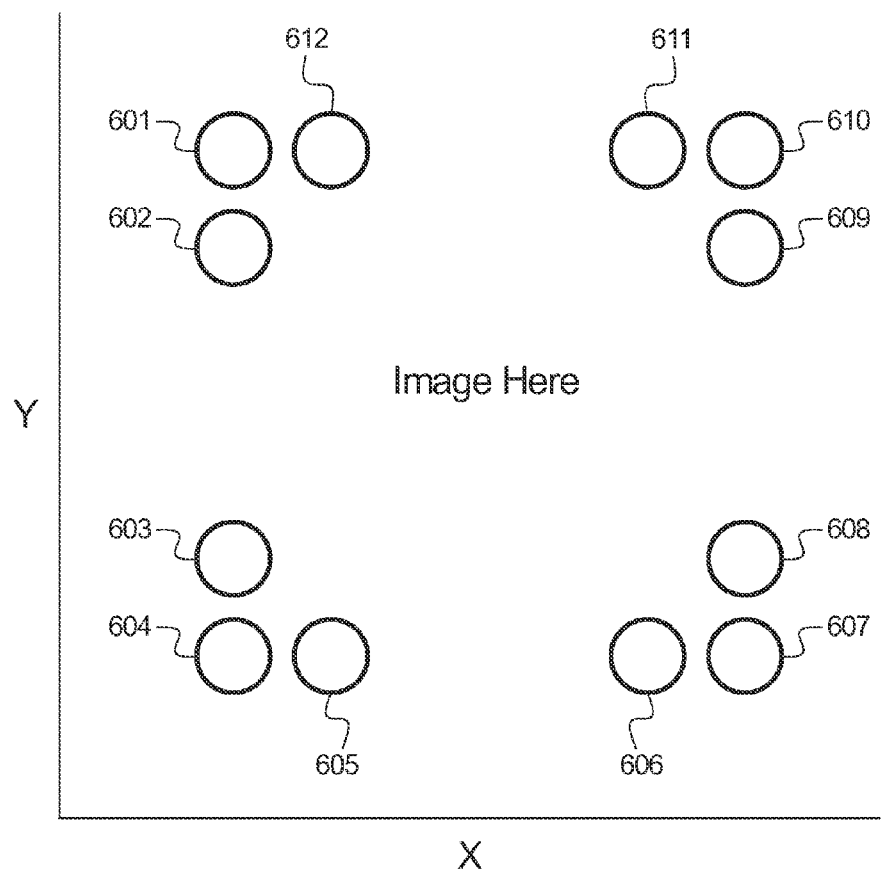

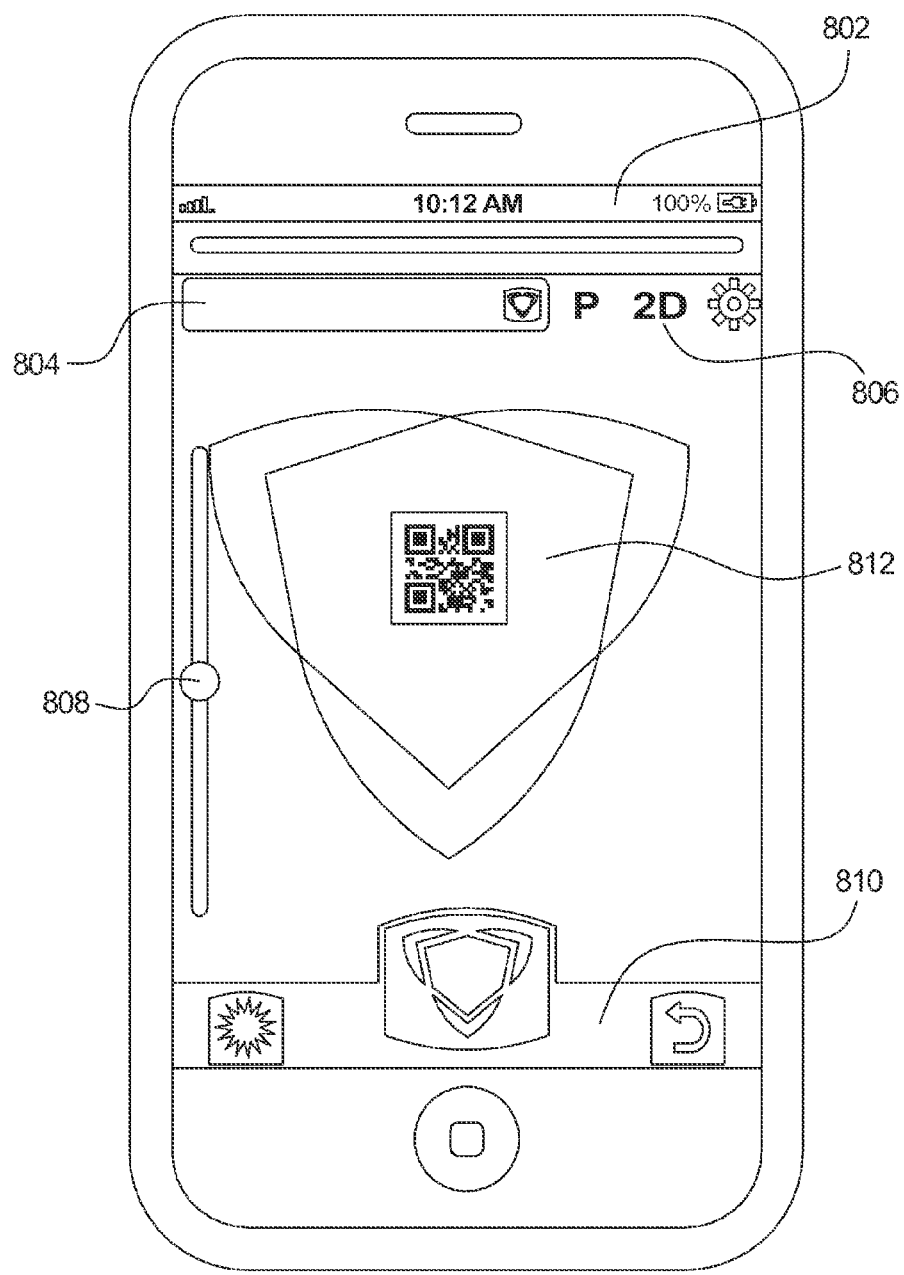

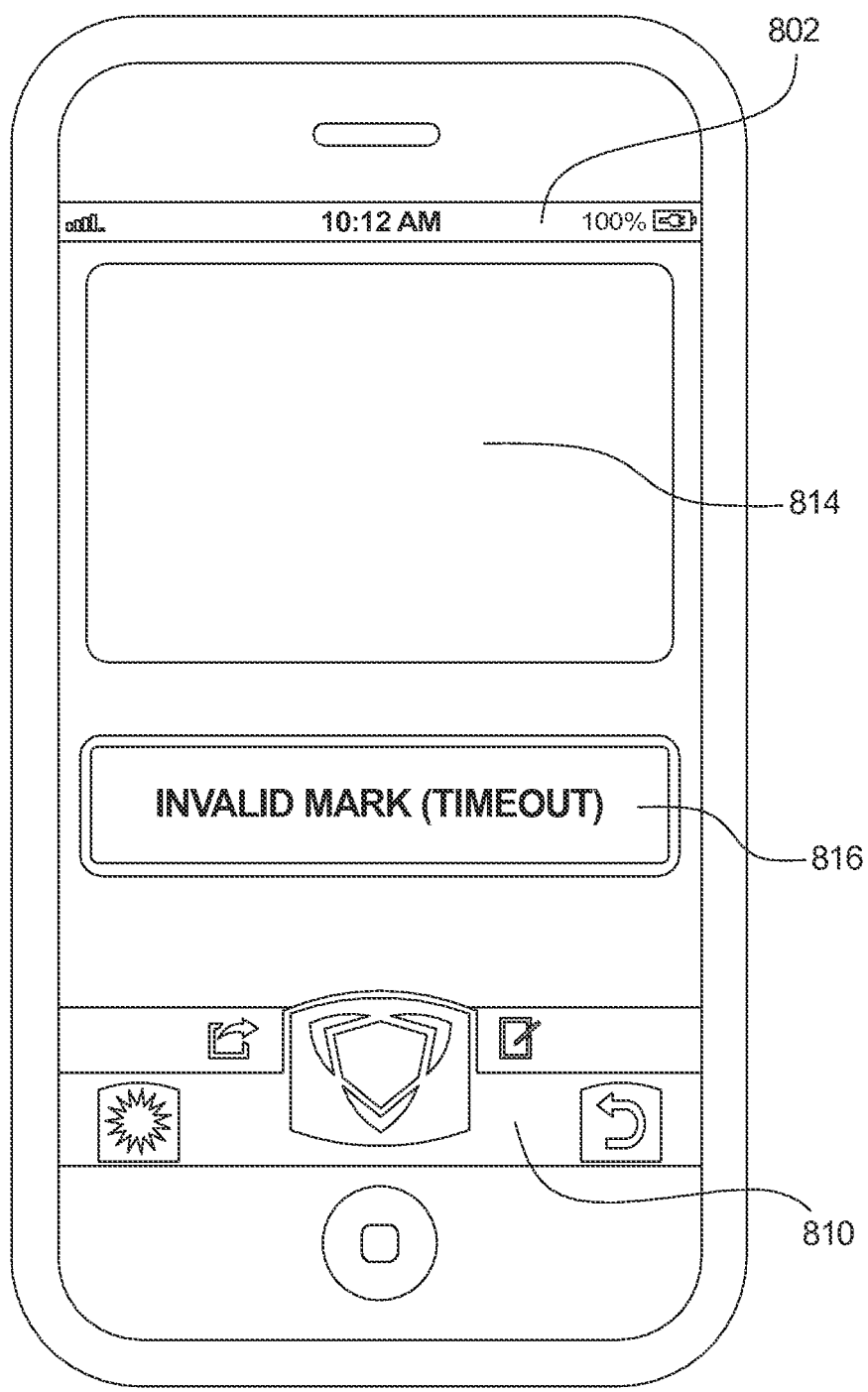

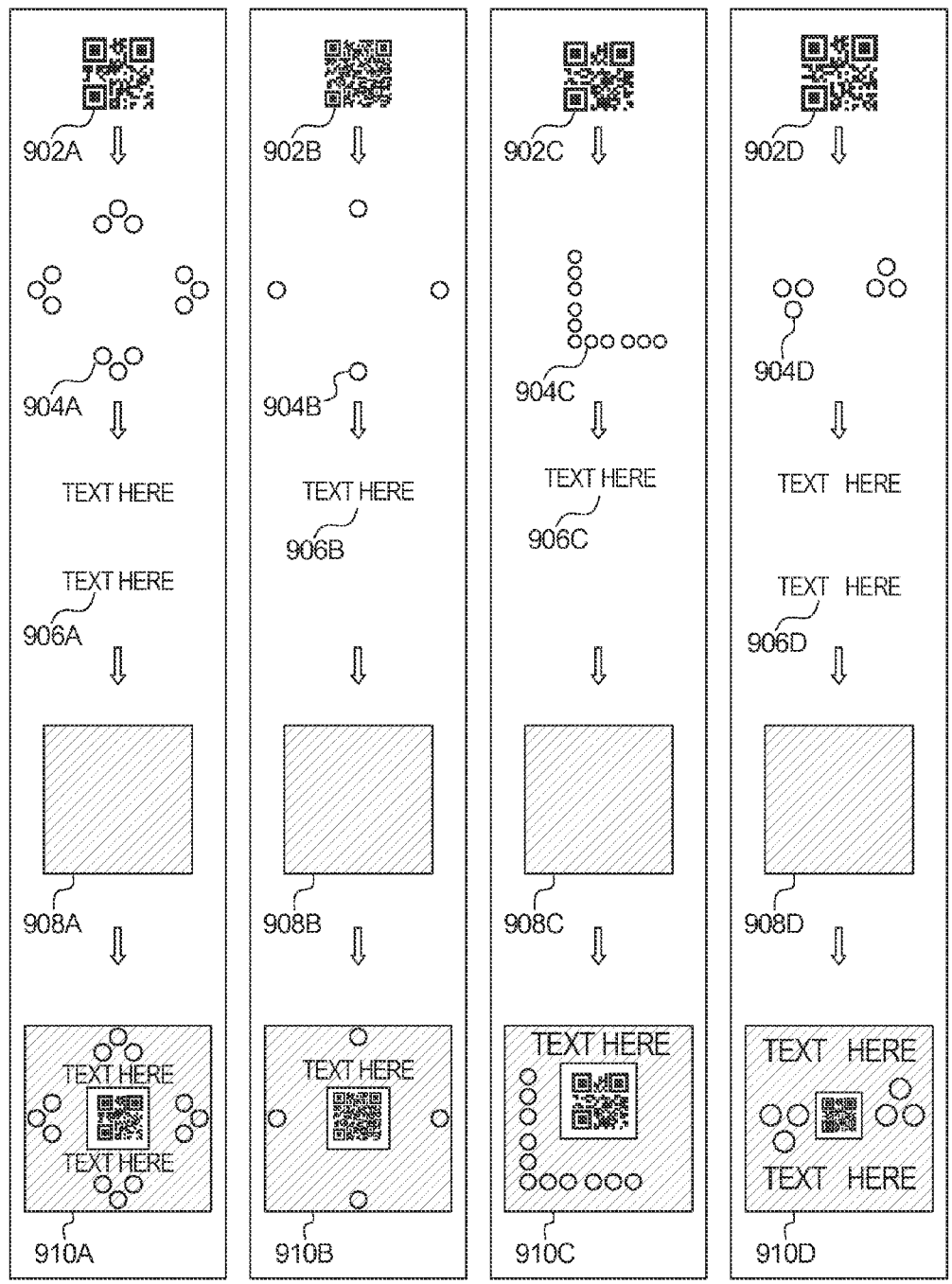

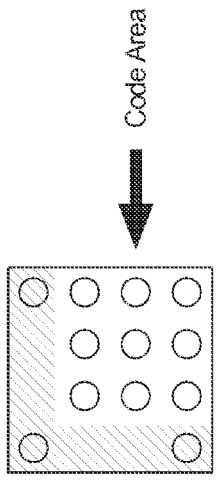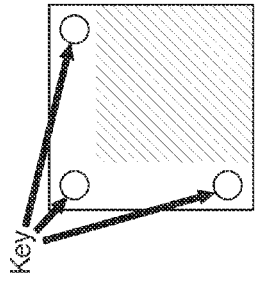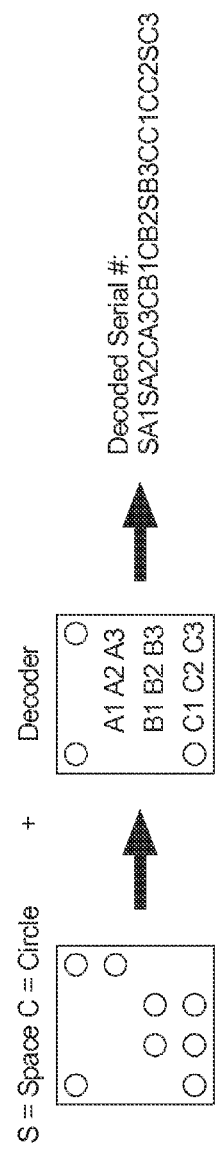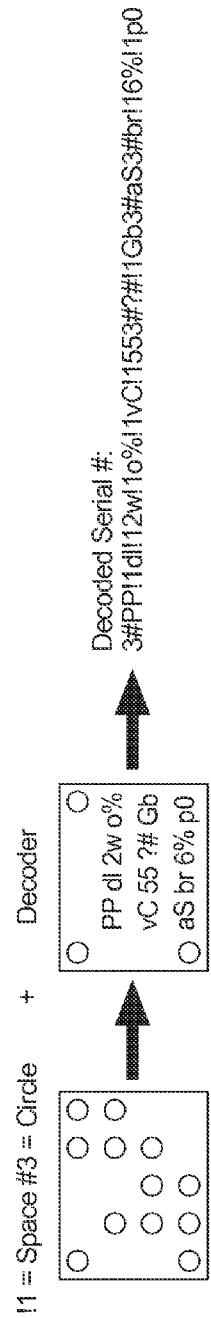
FIG. 11A
FIG. 11B
FIG. 11C
FIG. 11D

FIG. 12A
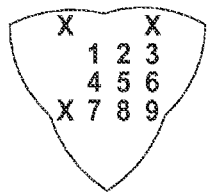
```
X     X
 1 2 3
 4 5 6
X 7 8 9
```
FIG. 12B
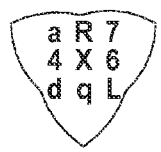
```
a R 7
4 X 6
d q L
```
FIG. 12C
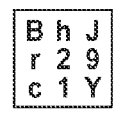
```
B h J
r 2 9
c 1 Y
```
FIG. 12D
```
0 r
B 2
h 9
J U
h R
```
FIG. 12E
```
0 B h J h
r 2 9 U R
```
FIG. 12F
```
B h J h
r 2 9 U
c 1 Y 7
```
FIG. 12H
```
0 r s          d y 5 h u        d y 5 h u
B 2   d         e 5              e 5
h 9       p    y u              y u
J U      9      4 t 7 6 6        4 t 7 6 6
h R    k           8 i              8 i
k C   2            9 9              9 9
5 p 1       8 G 4 Y n        8 G 4 Y n
```
FIG. 12G
```
あ い え
お う は
ひ す で
```

SYSTEM AND METHOD FOR ANALYSIS AND AUTHENTICATION OF COVERT SECURITY INFORMATION USING A SMART DEVICE

CROSS-REFERENCE TO RELATED APPLICATIONS

This application claims priority to, and the benefit of, U.S. Provisional Patent Application No. 61/713,422, filed Oct. 12, 2012, and U.S. Provisional Patent Application No. 61/719,385, filed Oct. 27, 2012, the contents of which are hereby incorporated herein by reference in their entireties.

FIELD

The present disclosure relates generally to systems for capturing, analyzing and authenticating documents and/or images, and more particularly to systems and methods of detecting and authenticating hidden or covert security features using smart devices such as, for example, smart phones.

BACKGROUND

Unless otherwise indicated herein, the materials described in this section are not prior art to the claims in this application and are not admitted to be prior art by inclusion in this section.

For several reasons, it is highly desirable to identify counterfeit or fraudulent documents, such as to identify fraudulent products with counterfeit packaging and/or other identifying information. Advancing technology, such as improved software applications, printers and copiers, has enabled the proliferation of counterfeit documents. For example, grey market or knock-off goods are difficult to distinguish from authentic and/or authorized goods. Identifying a product as authentic based on its packaging or other documentation is especially important when dealing with products, such as pharmaceutical products, where the effect of a counterfeit product may be life-threatening. As additional examples, a counterfeit vehicle title can be very costly to an unsuspecting purchaser, and fake coupons can be costly to a business. Therefore, it is important to develop a method for providing tamper-resistant security information in documents along with the ability to readily authenticate that security information.

SUMMARY

The following disclosure is directed toward detecting and authenticating hidden security features using smart devices. According to some embodiments, a smart device is equipped with a camera and a capture application which combine to provide focusing, filtering, and image capture capability. According to some embodiments, the smart device is configured to capture and preprocess images containing hidden security features, and communicate with a network-based security service for decoding and authentication of hidden security features. According to some embodiments, the smart device is configured to communicate with a decoding application, decision processor, and database on the smart device to decode and authenticate hidden security features. According to some embodiments, information as to the authenticity of the hidden security feature and any related information is then received by the smart device and reported to a user via a variety of available methods, such as text messaging, email, audible alerts, displaying of decoded images, or similar methods.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

The accompanying drawings, which are incorporated into this specification, illustrate one or more example embodiments disclosed herein and, together with the detailed description, serve to explain the principles and example implementations of the present disclosure. One of skill in the art will understand that the drawings are illustrative only, and that what is depicted therein may be adapted based on the text of the specification and the spirit and scope of the teachings herein.

FIG. 6 illustrates an example embodiment of a hidden focus pattern that may be used with the system, showing relative positioning of elements within the example pattern, according to an embodiment of the present disclosure.

FIG. 8A illustrates a display screen of an example authentication application operating on a mobile device during an image capture process, according to an embodiment of the present disclosure.

FIG. 8C illustrates another display screen of the example authentication application shown in FIG. 8A during reporting of a timeout, which may occur when a hidden/covert security feature cannot be detected by capture application.

FIG. 9A illustrates an example of the code, optical target pattern, hidden information, and background components that are combined to create a hidden security feature to be authenticated, according to an embodiment of the present disclosure.

FIG. 9B illustrates another example of the code, optical target pattern, hidden information, and background components that are combined to create a hidden security feature to be authenticated, according to an embodiment of the present disclosure.

FIG. 9C illustrates another example of the code, optical target pattern, hidden information, and background components that are combined to create a hidden security feature to be authenticated, according to an embodiment of the present disclosure.

FIG. 9D illustrates another example of the code, optical target pattern, hidden information, and background components that are combined to create a hidden security feature to be authenticated, according to an embodiment of the present disclosure.

FIG. 11A illustrates an example in which a serial number is extracted from a pattern of hidden characters using guide elements that serve as a key, according to embodiments of the present disclosure.

FIG. 11B illustrates the pattern of hidden characters shown in FIG. 11A, but with guide elements forming the key shaded.

FIG. 11C illustrates an example of a 3 by 3 coded pattern that defines a serial number according to a decoder, according to an embodiment of the present disclosure.

FIG. 11D illustrates an example of a 3 by 4 coded pattern that defines a serial number according to a decoder.

FIG. 12A illustrates an example configuration for a pattern patterns of characters including alphanumeric characters and key elements to be embedded in security feature, according to embodiments of the present disclosure.

FIG. 12B illustrates an example configuration for a pattern of characters including alphanumeric characters, but no key elements, according to embodiments of the present disclosure.

FIG. 12C illustrates an example configuration for a pattern of characters including alphanumeric characters situated in an orienting box shape, according to embodiments of the present disclosure.

FIG. 12D illustrates an example configuration for a pattern of characters including alphanumeric characters arranged in a 2 by 5 array, according to embodiments of the present disclosure.

FIG. 12E illustrates an example configuration for a pattern of characters including alphanumeric characters arranged in a 5 by 2 array, according to embodiments of the present disclosure.

FIG. 12F illustrates an example configuration for a pattern of characters including alphanumeric characters arranged in a 3 by 4 array, according to embodiments of the present disclosure.

FIG. 12G illustrates an example configuration for a pattern of characters including an array of non-latin alphanumeric characters, according to embodiments of the present disclosure.

FIG. 12H illustrates an example configuration for a pattern of characters including alphanumeric characters arranged in a non-rectangular shape so as to spell out letters, according to embodiments of the present disclosure.

DETAILED DESCRIPTION

Figure 1:
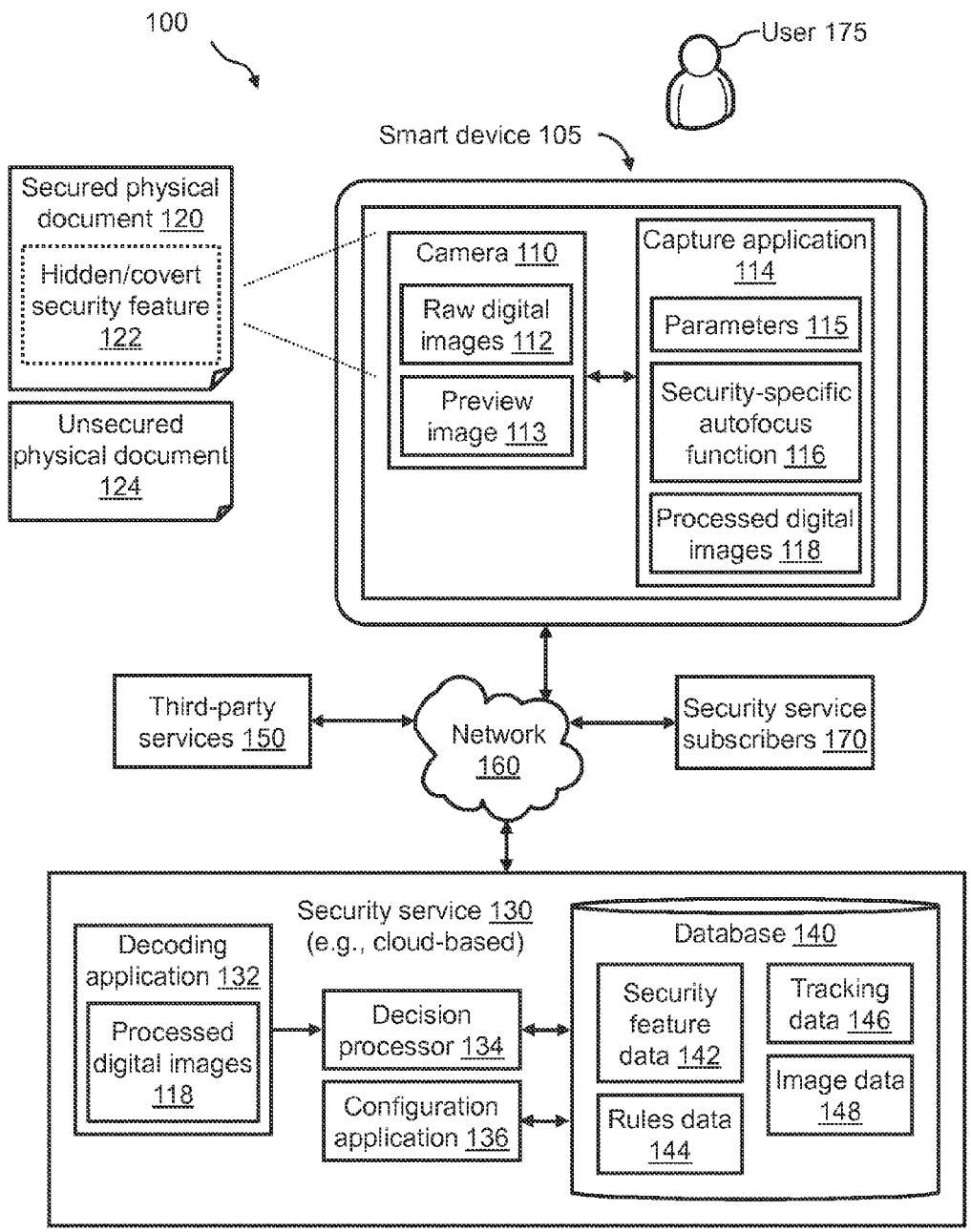
FIG. 1 illustrates a system for providing security feature detection and authentication services using a smart device communicatively coupled to a network based security service, according to one embodiment of the present disclosure.

As a means of product identification and tracking, a barcode such as a Universal Product Code (UPC) or a Quick Response (QR) code is often printed on the packaging of consumer products. These printed codes are optically scanned for rapid decoding. However, barcodes are readily visible on the product packaging and are susceptible to copying, adjustment, and other forgery. To reduce fraud, it is desirable to add hidden security information to product packaging as an alternative, or in conjunction with, barcode information and/or other tracking and identification information.

The hidden security information can be, for example, objects, symbols, characters, and/or markers that are not easily visible to the human eye, yet can be detected by other means, such as by optical detection. Optimally, it would be desirable to authenticate hidden security information using smart devices, such as a smart phone or tablet, as smart devices are prevalent, configurable, and are often carried on a person thus readily available when authentication is desired. However, several challenges limit the use of smart devices for optical detection of hidden security information. First, the camera systems in smart devices are designed to focus on faces, not hidden security information, and this is problematic if the hidden security information does not have contrast points for use in focusing. Also affecting the process is the effect of varying focal lengths on the image capture process, possibly requiring the smart device camera to be positioned at a predetermined distance and/or angle from the target in order to capture hidden security information. Additionally, mobile smart devices may have reduced computing power and/or battery life.

Systems and methods for hidden security feature detection and authentication using smart devices are provided. In some embodiments, the smart device acts as a remote client in a client-server architecture, capturing an image of a document potentially containing a hidden security feature and communicating with a server to process and authenticate the image. A smart device is a device that (1) includes an operating system that allows it to execute software, firmware, or hardware applications, (2) includes a digital camera, and (3) includes the capability to communicate via a network. According to some embodiments, a smart device is a mobile device, such as a smartphone or tablet device. The system uses the smart device in combination with a hosted security service to process physical documents with respect to covert security features. While hidden or covert security features are not easily visible to the human eye, the document security system uses image processing to determine the presence or absence of hidden or covert security features in digital images of physical documents, wherein the digital images are captured using the smart devices. According to some embodiments, the image processing and identification of the hidden or covert security features is provided via a hosted (e.g., cloud-based) security service that can support a plurality of smart devices and a variety of customized hidden security features.

According to some embodiments, the system provides configurable applications for mobile platforms that decode and authenticate hidden or covert security features. This can be accomplished using internal manipulation of the camera feed, image processing both on the smart device and a cloud-based server, and/or database lookup/authentication capability on the cloud-based server. In one example, the hosted security service supports a plurality of camera-enabled smart devices, wherein the digital image data acquired by each device is used to identify the presence or absence of hidden/covert security features in physical documents. Additionally, the hosted (e.g., cloud-based) security service processes the hidden or covert security features with respect to certain rules that determine what action(s) are returned to an originating smart device. Further, according to some embodiments, the hosted security service can, for audit purposes, maintain a record of all images processed using the document security system described herein. Accordingly, in some embodiments, a camera-enabled smart device in combination with a hosted security service of the document security system provides a configurable and convenient method of processing hidden/covert security features in physical documents that is otherwise not possible using conventional methods.

FIG. 1 illustrates a block diagram of an example system 100 for providing security feature detection response services to smart devices. In one example, system 100 includes one or more smart devices 105, a security service 130, and one or more third-party services 150 that are communicatively connected via a network 160. Network 160 may be, for example, a local area network (LAN) and/or a wide area network (WAN), including a cellular network, for connecting to the Internet or any cloud computing environment, or any private or public network. Entities of system 100 may connect to network 160 by any wired and/or wireless means. Security service 130 is, for example, a document authentication service. Security service 130 may be implemented as a hosted (e.g., cloud-based) service to which entities (or customers) may subscribe. For example, one or more security service subscribers 170 may be associated with system 100, wherein security service subscribers 170 are the subscribers to the security service 130 supported by system 100. Certain users 175 are associated with each respective security service subscriber 170.

A user 175 accesses security service 130 via a smart device 105 and then uses the smart device 105 as a convenient and portable mechanism for authenticating documents. Smart device 105 may comprise, for example, any smart mobile device that (1) includes an operating system (OS) that allows execution of software applications, (2) includes a built-in digital camera, and (3) includes network capability. Examples of smart device 105 include, but are not limited to, Android-based phone, the Apple iPhone, the Apple iPad, the Samsung Galaxy tablet, Windows phone, and Blackberry phone or tablet. As such, smart device 105 may include mobile operating system(s), such as, but not limited to, the Android OS from Google, Inc., the BlackBerry OS from Research In Motion Limited (RIM), the iOS from Apple Inc., the Series40 (S40) OS from Nokia, the Symbian OS from Nokia and Accenture, the Bada OS from Samsung Electronics, the Windows Phone OS from Microsoft, and the webOS from Hewlett Packard.

However, smart device 105 of system 100 is not limited to smart mobile devices only. Smart device 105 of system 100 may be any computing device that is capable of running software applications, that includes a built-in digital camera or that is otherwise connected to a digital camera, and that has network capability. Namely, smart device 105 can be, for example, a personal digital assistant (PDAs), mobile phone, scanning/imaging device, tablet device, desktop computer, laptop computer, dedicated document scanning device, and/or server.

Each smart device 105 includes or is otherwise connected to a digital camera 110. Raw digital images 112 are any images captured using camera 110 of the smart device 105. A user 175 can use camera 110 of their smart device 105 as a convenient means to capture raw digital images 112 of a physical document to be analyzed via security system 130. For example, user 175 can use camera 110 of their smart device 105 to capture raw digital images 112 of secured physical document 120 that include hidden/covert security feature(s) 122 or of unsecured physical document 124, wherein unsecured physical documents 124 do not include hidden/covert security feature 122. Both secured physical document 120 and unsecured physical document 124 can be any hardcopy document (e.g., hardcopy paper document, credit card, government-issued ID, currency, etc) or physical surface of any object (e.g., product packaging or product itself) that have, for example, alphanumeric characters, symbols, markers, and/or graphics thereon, such as applied by printing. The print density of the document may be between a range from about 1% to 90%, but will commonly be in the range from approximately 5% to 70%.

Hidden/covert security feature 122 of secured physical document 120 is, for example, alphanumeric characters, objects, symbols, or markers that are not easily visible to the human eye, yet can be detected using features of document security system 100. In some embodiments, hidden/covert security feature 122 comprises a background/foreground image including big dot configurations, little dot configurations, ODT pantographs, AGPantograph 4000, Prism™ technology, barcodes (including UPC, GS1, Data Matrix, QR, PDF417, Aztec, or other barcodes), dots and lines over pantograph, microprint over pantograph, pantograph under/over the VeriGlow™ technology from Document Security Systems, Inc (Rochester, N.Y.), and/or Prism™ technology combined with VeriGlow™ technology. Examples of hidden/covert security feature 122 have been previously described in U.S. Patent application No. 61/555,843, filed Nov. 4, 2011, entitled "System and Method for Dynamic Generation of Embedded Security Features in a Document;" U.S. patent application Ser. No. 11/495,900 entitled "Covert Document System;" U.S. patent application Ser. No. 11/741,394 entitled "Document with Linked Viewer File for Correlated Printing;" U.S. Pat. No. 7,906,198 entitled "Document Containing Security Images;" and U.S. Pat. No. 7,976,068 entitled "Double-blind Security Features," each of which is incorporated herein by reference in its entirety.

Any information may be encoded into hidden/covert security feature 122. For example, hidden/covert security feature 122 may convey unique product information, unique promotional codes, ownership information (e.g., name, address, phone number), any user-defined information, any mark indicating authenticity, and the like.

According to some embodiments, secured physical document 120 and unsecured physical document 124 may be documents that are specific to entities that subscribe to security service 130 of system 100. Therefore, the hidden/covert security feature 122 that is embedded in secured physical document 120 may be designed according to certain parameters provided by each respective security service subscriber 170. In other words, hidden/covert security feature 122 may be a subscriber-specific security feature or combination of features. To support multiple security service subscribers 170, a capture application 114 is provided on smart device 105, wherein the capture application 114 is a software application that is a configurable to meet the security specifications of a given security service subscriber 170. In one example, capture application 114 is implemented as a smartphone app, such as an Android app or an iPhone app. In another example, capture application 114 is implemented as a tablet app, such as an iPad app or Galaxy Tab app.

Hidden/covert security features 122 are constructed, for example, using lines, dots, dashes, whitespaces, or microprint whose features are spaced too closely to be visible by the human eye. To the eye, these lines, dots, dashes, whitespace, or microprint simply appear as, for example, a tinted region revealing no discernable content. However, these lines, dots, dashes, whitespaces, or microprint are optically detectable via camera 110. According to some embodiments, the lines, dots, dashes, whitespaces, or microprint that form the hidden/covert security feature 122 are designed according to parameters provided by the security service subscriber 170, wherein the parameters may be different from one security service subscriber 170 to another. Accordingly, in some embodiments, capture application 114 includes a set of parameters 115.

According to some embodiments, any information in parameters 115 can be modified to customize the detection capability for security purposes. Parameters 115 include, for example, line frequency, screen angles, text/content, image structure, color, and related data. Further, in some embodiments, the contents of parameters 115 are subscriber-specific. For example, a smart device 105 associated with a first security service subscriber 170 may include parameters 115 that are specific to the first security service subscriber 170. However, a smart device 105 associated with a second security service subscriber 170 may include parameters 115 that are specific to the second security service subscriber 170, thus allowing the capture application 114 to be configured based on security service subscribers 170. Also, parameters 115 may comprise specific configuration information for patterns used within hidden security features 122, such as the configuration of the pattern shown in FIG. 6, allowing the particular configuration information for a recognized pattern to be available for analysis and/or comparison during the decoding process.

According to some embodiments, capture application 114 installed on a smart device 105 further includes a security-specific autofocus function 116 that is used for controlling the focus of camera 110. As is well-known, autofocus is a function that automatically focuses the camera lens on a subject. The mechanisms of autofocus functions found on cameras can be roughly classified into two categories—phase detection and contrast detection. However, according to some embodiments, security-specific autofocus function 116 differs from the standard autofocus function included in standard digital cameras in that it tailors the autofocus function based on the information in parameters 115, and combines the autofocus process with a filtering process to attempt to identify image data corresponding to hidden/covert security features 122. In some embodiments, security-specific autofocus function 116 uses the information in parameters 115, which corresponds to the design of a hidden/covert security feature 122 to be detected, to control the focal length adjustment during the autofocus and filtering process in such as way as to optically reveal the image data corresponding to hidden/covert security feature 122. This process may be aided by a focusing target or pattern embedded in hidden/covert security feature 122, which will allow the capture application 116 to optimally capture the latent image and/or text in hidden/covert security feature 122 using the focusing target or pattern. Because the information in parameters 115 can differ from one security service subscriber 170 to another, the security-specific autofocus function 116 of capture application 114 is configurable from one security service subscriber 170 to another.

The presence of security-specific autofocus function 116 in capture application 114 allows the smart device 105 to be positioned at a wide range of acceptable distances and angles from the target. Alternatively, in some embodiments, the smart device 105 can be positioned at a pre-determined angle and/or range, such as, for example, a fixed smart device system used for applications such as airport gate ticket verification, event ticketing, or store checkout. During the autofocus operation, with each focal length adjustment a preview image 113 is streamed in real time from camera 110 to capture application 114. Security-specific autofocus function 116 attempts to focus and filter preview image 113 to optically reveal image data corresponding to the hidden/covert security feature 122. If the hidden/covert security feature 122 is in focus and optically revealed, a raw digital image 112 that includes the hidden/covert security feature 122 is captured. In the case of unsecured physical document 124 in which no hidden/covert security feature 122 is present, the security-specific autofocus function 116 ends the focus and filtering process after a configurable number of attempts and then captures the raw digital image 112. In some embodiments, the smart device 105 may then report to the user 175 that no hidden/covert security feature 122 was found.

According to some embodiments, capture application 114 may generate an audible indicator, a visual indicator, a tactile indicator, or any combinations thereof when the autofocus function is complete and the raw digital image 112 has been captured. For example, using the capabilities already built into the smart device 105, capture application 114 can generate a beeping or buzzing sound, a readable message on the display, or a vibration to indicate that the raw digital image 112 has been captured.

System 100 provides benefits over current smart device applications for detecting hidden/covert security features in documents. In one example, system 100 provides a security specific autofocus function, whereas existing smart device applications do not provide such function. The system 100 allows the smart device 105 to detect hidden/covert security features from a wide range of focal lengths and angles. Thus, the smart device 105 is not required to be oriented in a specific manner or at a specific distance relative to the secured physical document 120. Additionally, system 100 allows for configurable security features, such that the hidden/covert security feature(s) 122 can be adjusted and/or optimized for particular customers and/or secured physical documents 120, yet multiple types of hidden/covert security features 122 can be analyzed by a smart device 105. Thus, the system 100 is sufficiently flexible to support a variety of security service subscribers 170, smart devices 105, and hidden/covert security features 122

According to some embodiments, the purpose of the security-specific autofocus function 116 is not to perform the decoding process, which is the process of identifying and authenticating hidden/covert security features 122. Instead, the purpose of the security-specific autofocus function 116 is to acquire a raw digital image 112 in which the hidden/covert security feature 122 is revealed with enough clarity or detail that the feature can be decoded automatically using image processing software. According to some embodiments, once a raw digital image 112 is captured using camera 110, parameters 115, and security-specific autofocus function 116, the capture application 114 is used for preprocessing the image data of raw digital images 112. For example, the preprocessing performed by capture application 114 is to modify the original image data of raw digital images 112 in a manner that is useful for further image processing at security service 130, and more particularly for detecting hidden/covert security feature 122 at security service 130. In image processing, the preprocessing operation can be, for example, smoothing. According to some embodiments, based on the subscriber-specific information in parameters 115, capture application 114 can be used to apply certain optical filtering, certain angles, certain line frequency, certain color, certain density, certain micro-printing to raw digital images 112. Capture application 114 can segment a portion of raw digital images 112 according to predetermined locations at which security features would be expected to appear. In this way, raw digital images 112 are processed using capture application 114 to produce processed digital images 118 that are more appropriately suited for security feature decoding. According to some embodiments, in processed digital images 118 a certain amount of, for example, the background image, opposite angle image, dot size, and/or dot shape has been filtered out, thereby revealing, for example, the lines, dots, dashes, whitespaces, and/or microprint of the foreground image (i.e., the hidden security feature(s)) to at least some degree.

Then, in some embodiments, using the information in parameters 115 that is supplied by capture application 114 combined with certain image processing methods, the hidden/covert security feature 122 in processed digital images 118 is detectable and/or decoded at security service 130. For example, processed digital images 118, along with subscriber-specific information from parameters 115, are transmitted via network 160 to a decoding application 132 at security service 130. Using subscriber-specific information in parameters 115, decoding application 132 performs additional image processing to further enhance processed digital images 118 in order to detect image data corresponding to hidden/covert security features 122 embedded therein. According to some embodiments, decoding application 132 is based, for example, on image processing algorithms, such as algorithms based on the Prism™ technology from Document Security Systems, Inc (Rochester, N.Y.) as well as standard digital image processing algorithms, such as linear filtering, pixilation, fractals, and other known processes.

According to some embodiments, if an acceptable original raw digital image 112 is obtained from of a secured physical document 120, decoding application 132 will detect information related to a hidden/covert security feature 122 embedded therein according to parameters 115. However, if the original raw digital image 112 is an image of an unsecured physical document 124, no hidden/covert security feature 122 will be detected by decoding application 132. Additionally, with respect to secured physical documents 120, the hidden/covert security feature 122 thereof may be authentic; however, there is also the possibility of counterfeit hidden/covert security feature 122, e.g. hidden/covert information in the document 102 that is fake, forged, or otherwise inauthentic. In the latter case, secured physical documents 120 are counterfeit secured physical documents 120.

In the case of secured physical document 120, decoding application 132 passes data relating to the hidden/covert security feature 122 that it detected, to a decision processor 134 of security service 130. In one example, decoding application 132 only passes the image data of the hidden/covert security feature 122 found in processed digital image 118 to decision processor 134, e.g. via filtering, cropping, or otherwise screening the image data to remove unnecessary information. In another example, decoding application 132 passes the image data of the entire processed digital image 118 (including the image data relating to hidden/covert security feature 122) to decision processor 134. However, in the case of unsecured physical documents 124, decoding application 132 may optionally pass information to decision processor 134 that information relating to a hidden/covert security feature 122 is absent from the processed digital image 118. In either case, in processing the information received from decoding application 132, decision processor 134 queries a database 140 of security service 130. In yet another embodiment, the decoding application 132 and decision processor 134 are combined into a single function or process, and/or the decoding application 132 communicates directly with database 140.

Stored in database 140 are, for example, security feature data 142, rules data 144, tracking data 146, and image data 148. Security feature data 142 includes a record of unique hidden/covert security features 122 that have been verified as authentic. Additionally, security feature data 142 includes a record of hidden/covert security features 122 that have been identified as counterfeit. Like parameters 115, the information in security feature data 142 may be subscriber-specific. Using decision processor 134, the image data associated with a hidden/covert security feature 122 detected by decoding application 132 is compared to information in security feature data 142 in order to uniquely identify the associated hidden/covert security feature 122. According to some embodiments, there are unique identifying marks, data, and the like in hidden/covert security features 122 so that the data from hidden/covert security features 122 can be properly associated with additional metadata upon lookup on the security service 130, as further discussed below and illustrated in FIG. 7.

Once the data relating to hidden/covert security feature 122 has been verified, decision processor 134 queries rules data 144 for information about actions to be taken. Like parameters 115, the information in rules data 144 may be subscriber-specific. In one example, rules data 144 may indicate to transmit a text message (e.g., via SMS) to the originating smart device 105. Using the example of a hidden/covert security feature 122 on a product package, wherein the hidden/covert security feature 122 indicates product information, examples of text messages include AUTHENTIC PRODUCT, NOT AUTHENTIC PRODUCT, FOR USE IN USA ONLY, or any other customized message as appropriate for a particular product package. Using the example of a hidden/covert security feature 122 on a paper document, wherein the hidden/covert security feature 122 indicates authenticity, examples of text messages include AUTHENTIC DOCUMENT, NOT AUTHENTIC DOCUMENT, and the like.

In another example, rules data 144 may indicate to engage a certain third-party service 150. For example, if a counterfeit hidden/covert security feature 122 is detected, security service 130 may electronically mark the associated image data to indicate the counterfeit and/or transmit a message to an administrator, a document author, a document controller, a product manufacturer or distributor, a law enforcement agency or other authoritative entity, and the like, which are examples of third-party services 150. In another example, if the hidden/covert security feature 122 is associated with a marketing promotion, security service 130 may transmit a message to a marketing agency or a product manufacturer or distributor, which are other examples of third-party services 150. In response, the marketing agency may transmit marketing information (e.g., a coupon, a promotion code, etc.) to the originating smart device 105. Third-party services 150 may communicate directly with the originating smart device 105 via network 160. Additionally or alternatively, third-party services 150 may pass all or certain communications with smart device 105 through security service 130.

According to some embodiments, tracking data 146 of database 140 of security service 130 includes records of all processed digital images 118 that are received and processed via security service 130. In some embodiments, each record in tracking data 146 includes tracking information for a particular digital image transaction, such as, for example, user ID, device ID, network address, timestamp, etc. Additionally, for each record in tracking data 146, the image data of the processed digital image 118 itself and/or other data relating to the hidden/covert security feature 122 may be stored for auditing purposes in image data 148 of database 140.

According to some embodiments, configuration application 136, which is an optional component of security service 130, is an administrator tool that is used to pre-configure security feature data 142, rules data 144, tracking data 146, and image data 148. In addition to information as previously described, rules data 144 may also include user-level or group-level permissions with respect to access to security service 130 of system 100 and/or with respect to access to secured physical document 120.

Document security system 100 provides the capability to maintain a single, centralized repository of data relating to hidden/covert security features 122 against which digital images of secured physical documents 120 and unsecured physical documents 124 can be compared, regardless of origin. According to some embodiments, when certain hidden/covert security features 122 are changed or new hidden/covert security features 122 are created, the database 140 is updated thereby affecting how secured physical documents 120 are serviced in the future.

According to some embodiments, an example of the operation of system 100 is as follows. The user 175 uses his/her smart device 105 to capture a digital image of the secured physical document 120 that he/she wishes to authenticate. For example, the user 175 points the camera 110 of his/her smart device 105 at the secured physical document 120 and initiates the authentication process. In so doing, security-specific autofocus function 116 of the capture application 114 queries parameters 115 and then performs the autofocus function. Once the camera 110 is focused on the hidden/covert security feature 122, to begin the decoding process, a raw digital image 112 is captured. The capture application 114 performs preprocessing operations on the raw digital image 112 and generates a processed digital image 118. The processed digital image 118 of the document to be authenticated is transmitted via network 160 to security service 130 for decoding and/or verification. According to some embodiments, decoding application 132 of security service 130 uses image processing algorithms for analyzing the processed digital image 118 in order to detect data relating to hidden/covert security features 122 embedded therein. Then, decision processor 134 and information stored on database 140 are used to verify the hidden/covert security feature 122 and determine its authenticity. Security service 130 then returns the authentication results to the originating smart device 105. Once the authentication results are received at the originating smart device 105, notifications may optionally be provided such as, for example, audible, visual, or tactile indicators indicating whether the target secured physical document 120 is authentic or not authentic. For example, audible beeps at the originating smart device 105 can be used to indicate authenticity— one beep=authentic, two beeps=not authentic. As another example, a text message can be used to report the authenticity information. According to some embodiments, additional information relating to the hidden/covert security feature 122, including but not limited to image information associated with the security feature (e.g. a barcode such as a UPC, GS1, Data Matrix, QR, PDF417, Aztec, or other barcodes), location information, the image itself enhanced to show the hidden security information, and/or other related information is displayed on the smart device 105.

According to another embodiment, the system 100 can operate to display a preview of a security image on a smart device 105 as follows. The user 175 uses his/her smart device 105 to capture a digital image of the secured physical document 120 that he/she wishes to authenticate. For example, the user 175 points the camera 110 of his/her smart device 105 at the secured physical document 120 and initiates the authentication process. In so doing, security-specific autofocus function 116 of the capture application 114 queries parameters 115 and then performs the autofocus and filtering functions. In some embodiments, the autofocus function 116 is aided by a preferred focus target within the hidden/covert security feature 122, such as the examples shown in FIGS. 6, 7A-D, 9A-D, and 10A-G discussed below. Once the data related to hidden/covert security feature 122 is revealed with enough clarity or detail that the feature can be decoded using image processing software, a preview image 113 of the target secured physical document 120 is displayed to the user 175 on his/her smart device 105. The capture application 114 performs preprocessing operations, e.g., smoothing, on the preview image 113 and generates a processed digital image 118. The processed digital image 118 of the secured physical document 120 to be authenticated is transmitted via network 160 to security service 130 for decoding. Namely, decoding application 132 of security service 130 uses image processing algorithms for analyzing the processed digital image 118 in order to detect hidden/covert security feature 122 embedded therein. Then, an enhanced image that is generated by the decoding application 132 is returned to the originating smart device 105 and displayed to the user 175 in preview mode. The user 175 can then visually verify the presence of the expected hidden/covert security feature 122 on the target secured physical document 120 and determine authenticity.

Figure 2:
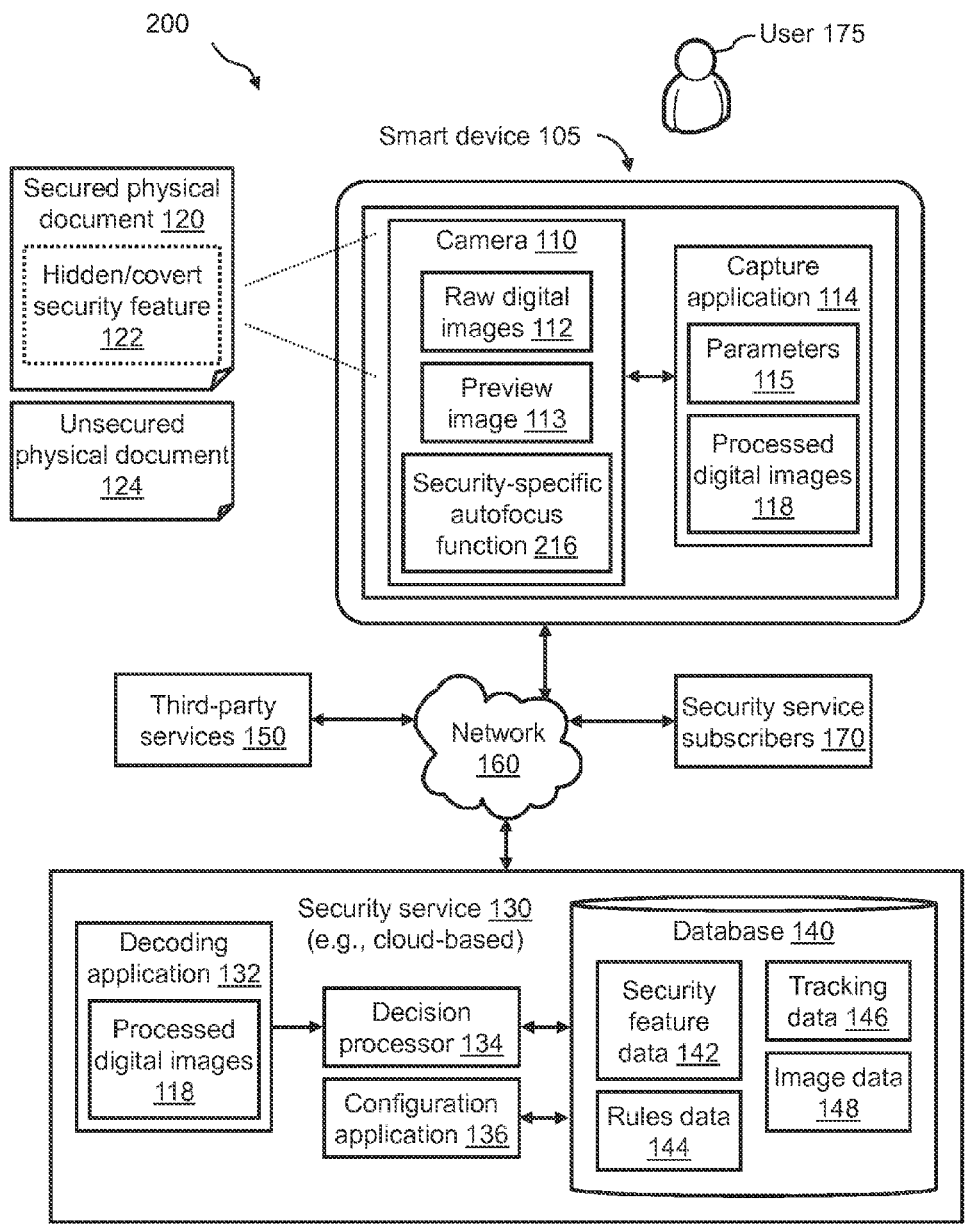
FIG. 2 illustrates a system for providing security feature detection and authentication services using a smart device communicatively coupled to a network based security service, according to another embodiment of the present disclosure.

FIG. 2 illustrates a block diagram of an example of a document security system according to another system configuration. In system 200, the smart device 105 is configured such that the security-specific autofocus function 216 is implemented in camera 110 of the smart device 105 instead of in capture application 114. In some embodiments, this configuration is accomplished by adding the security-specific autofocus function 216 to the hardware, firmware and/or software of the smart device 105, which may allow for more efficient and/or faster processing of security information during the authentication process.

Figure 3:
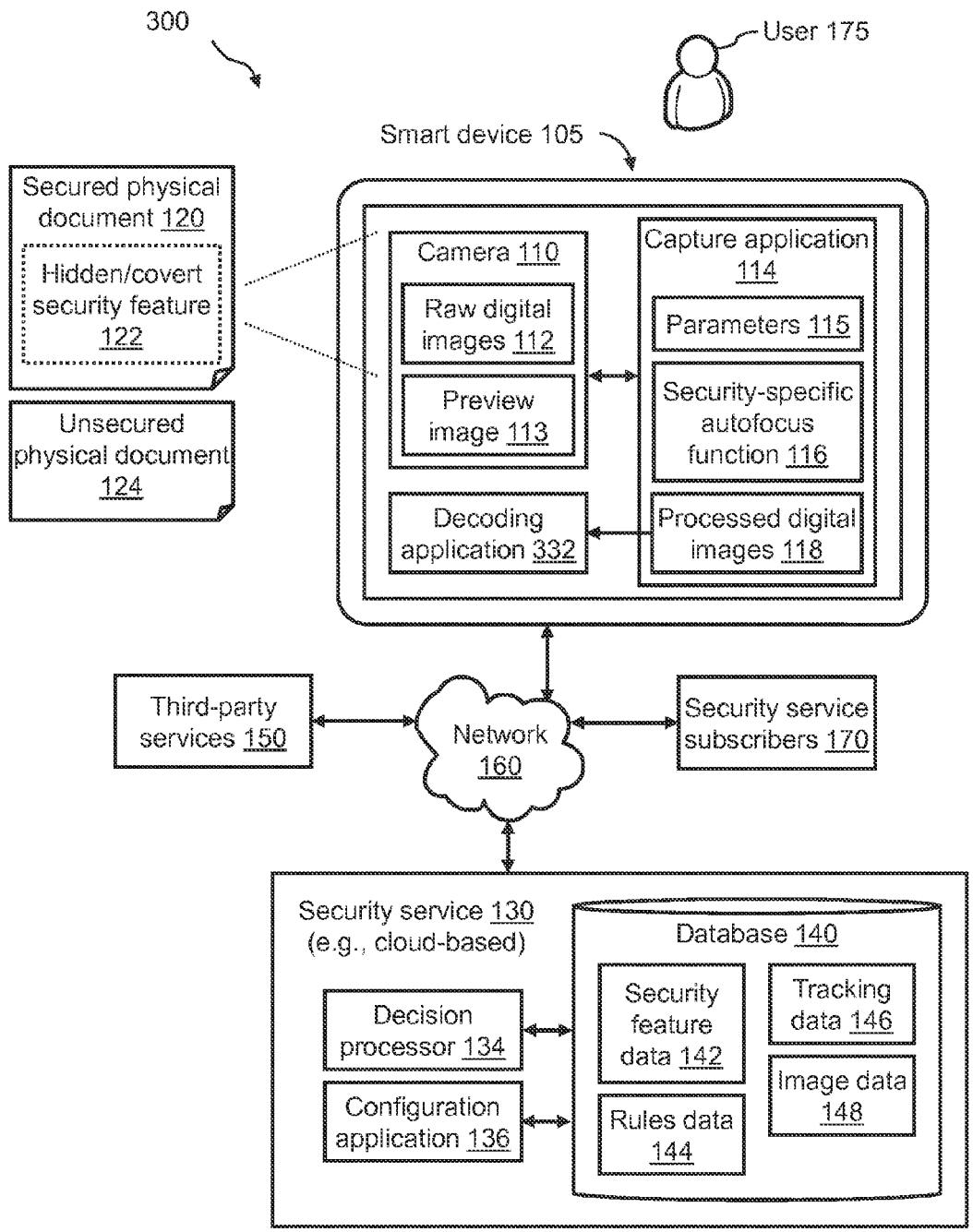
FIG. 3 illustrates a system for providing security feature detection and authentication services using a smart device communicatively coupled to a network based security service, according to yet another embodiment of the present disclosure.

FIG. 3 illustrates a block diagram of an example of a document security system according to yet another system configuration. Namely, whereas the decoding function in document security system 100 of FIG. 1 is implemented on the server 130, FIG. 3 illustrates a system configuration in which the decoding function 332 is implemented locally on the smart device 105. For example, system 300 of FIG. 3 is substantially the same as document security system 100 of FIG. 1, except that an instance of decoding application 332 is installed on each smart device 105, rather than having a single instance of decoding application 132 installed at security service 130 that supports all smart devices 105.

The system is not limited to the system configurations shown in FIGS. 1, 2, and 3. Other system configurations are possible. For example, instead of security service 130 being implemented on a global cloud-based server, security service 130 can be implemented on a local server of an enterprise, wherein the local server supports smart devices 105 and users 175 that are associated with the enterprise. In this example, the document security system is provided as an enterprise-based system configuration. In other embodiments, some or all of the functions of the security service 130 are instead performed on the smart device 105, e.g. the decoding application 132, decision processor 134, database 140 (including security feature data 142, rules data 144, tracking data 146, and/or image data 148), and/or configuration application 136 are provided directly on the smart device 105, such as, for example, the embodiment shown in FIG. 5 and discussed further below.

The disclosure described herein is not limited to documents containing hidden/covert security features, instead, the concepts of this disclosure may be applied to any media capable of including hidden/covert security feature 122, including but not limited to documents and/or images displayed electronically (e.g. on a video monitor, smart device, television, etc.), tattoos or similar markings, artwork, labels, packaging, and any other media capable of incorporating hidden/covert security feature 122 as discussed herein.

Figure 4A:
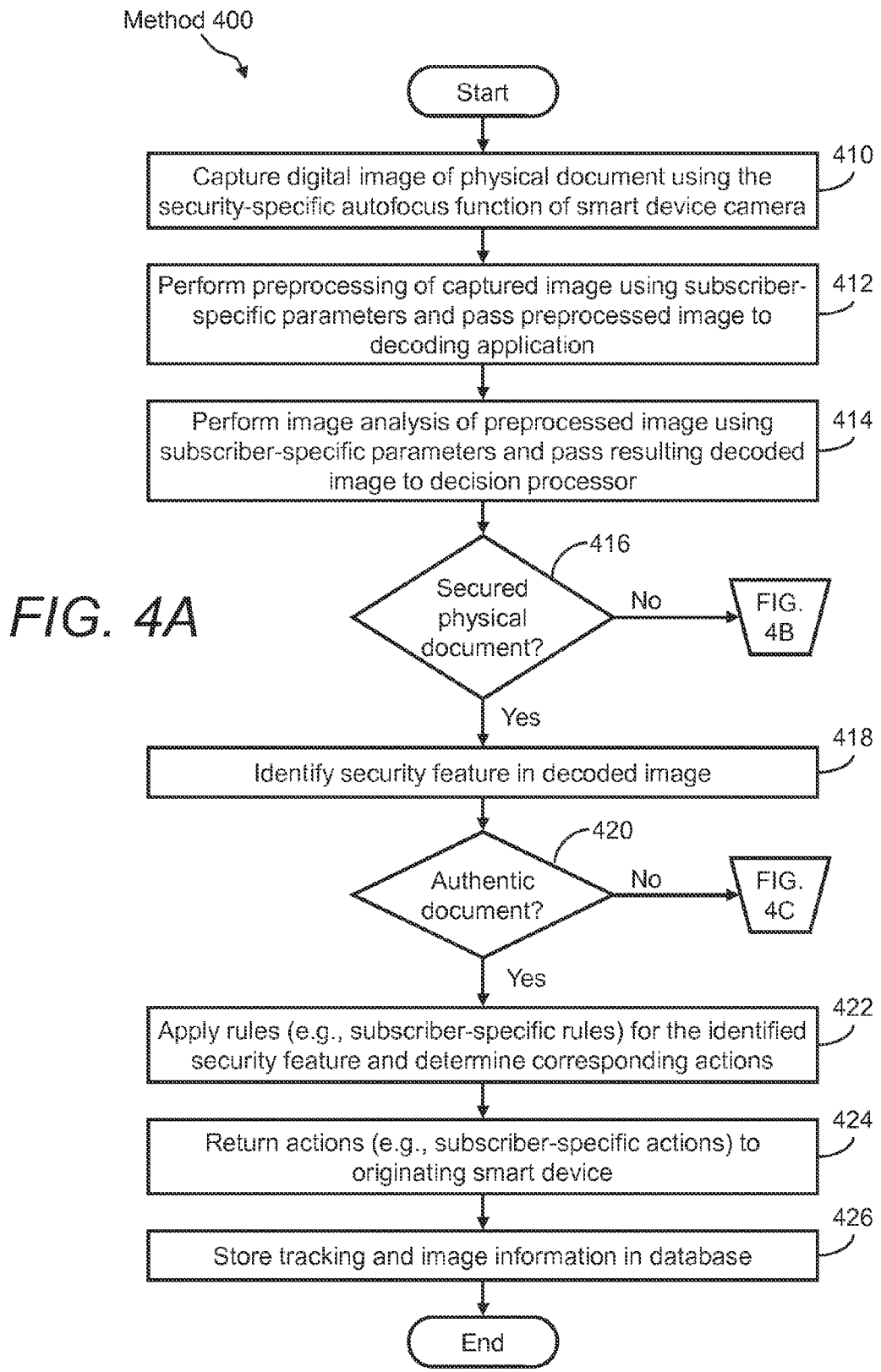
FIGS. 4A, 4B, and 4C are portions of a single flow diagram that illustrates a method of operation of the security feature detection and authentication system, according to an embodiment of the present disclosure.
Figure 4B:
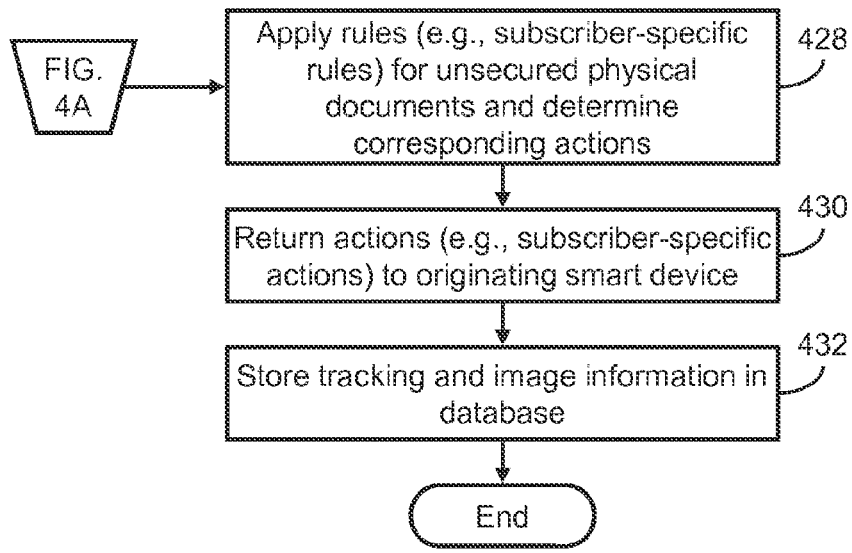
Figure 4C:
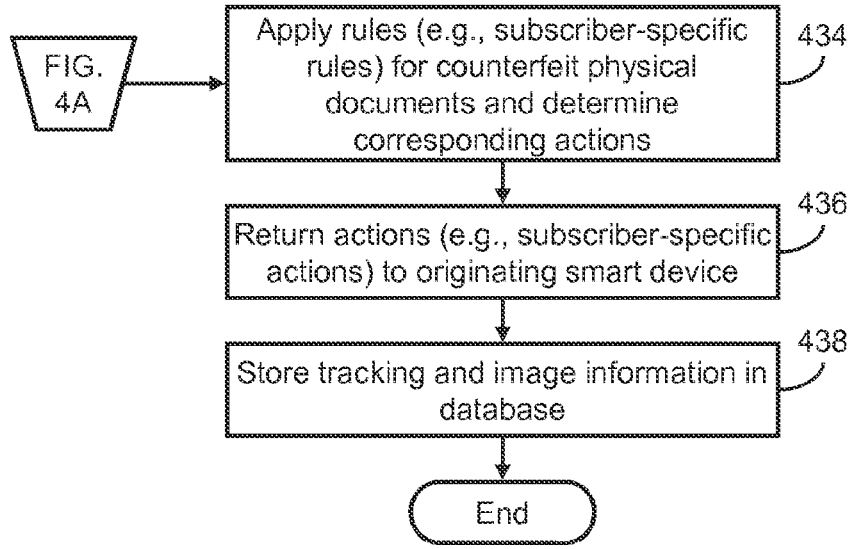

FIGS. 4A, 4B, and 4C illustrate a flow diagram of a method 400, which is an example of a method for performing the detection and authentication of hidden security features. In the example of method 400, hidden/covert security feature 122 of secured physical document 120 is used to indicate the authenticity of the physical document. Method 400 may include, but is not limited to, the following acts.

At 410, using the security-specific autofocus function 116, a digital image of a physical document, or portion thereof, is captured using a mobile device camera. For example, the user 175 points the camera 110 of his/her smart device 105 at secured physical document 120 containing hidden/covert security feature 122 and initiates the authentication process. In so doing, security-specific autofocus function 116 of the capture application 114 queries parameters 115 and then uses the information in parameters 115 as part of the focusing and filtering process used to reveal an image of hidden/covert security feature 122 during the autofocus function. According to some embodiments, the capture application 114 applies filtering at the same time as focusing to simultaneously adjust focal length and attempt to recognize hidden patterns and text in preview image 113 corresponding to hidden/covert security feature 122. The focusing and filtering operations may take place many times per second until the capture application 114 recognizes a pattern corresponding to hidden/covert security feature 122. In some embodiments, the capture application 114 has a set time period to recognize hidden patterns and/or text, and upon timeout determines the hidden/covert security feature 122 to be invalid or not present, and optionally captures an image for investigation purposes and/or storage in the database 140 under the assumption that the image may be an image of a counterfeit mark. Once a hidden/covert security feature 122 is sufficiently focused to begin the decoding process, as determined by the capture application 114, a raw digital image 112 is captured. According to some embodiments such as those shown in FIGS. 7A-D and FIGS. 9A-D, a barcode or other image may optionally be positioned adjacent to the hidden/covert security feature 122. According to some embodiments, if a barcode is present that information is also captured in raw digital image 112. Optionally, in embodiments storing location information, the capture application 114 will also store applicable Global Positioning System (GPS) information associated with location of the smart device 105 at the time an image is captured.

At 412, image data associated with the captured image is preprocessed and then the preprocessed image is passed to the decoding application 132. For example, capture application 114 preprocesses the image data of the raw digital image 112, thereby producing a processed digital image 118. In some embodiments, based on the subscriber-specific information in parameters 115, capture application 114 applies certain optical filtering, angles, line frequency, color, density, and/or micro-printing to raw digital images 112 and generates the corresponding processed digital image 118 in which a portion of, for example, the background image, opposite angle image, dot size, or dot shape has been filtered out, thereby revealing, for example, the lines, dots, dashes, whitespaces, or microprint of the foreground image (i.e., the hidden security feature) to at least some degree. Additionally or alternatively, capture application 114 can segment a portion of raw digital images 112 according to predetermined locations at which security features would be expected to appear, using standard image segmentation algorithms according to known references and/or software.

Algorithms for performing image processing can be found in many engineering textbooks relating to image processing, such as "Digital Image Processing" by Rafael C. Gonzalez & Richard E. Woods ($3^{rd}$ edition 2008) which is incorporated herein by reference in its entirety. In some embodiments, open source software libraries may be used for image detection. According to some embodiments, GPUImage software (see http://www.sunsetlakesoftware.com/2012/02/12/introducing-gpuimage-framework) can be used for image processing capabilities including live video stream filtering, to view the target image and adjust for pattern detection. This software may be used to apply a convolution matrix to detect horizontal or vertical lines, adjust exposure based on image brightness, adjust contrast to increase edge sharpness within the image, adjust to median settings to remove stray pixels, filter out noise based on a threshold, and perform other functionality applicable to the present disclosure. Additionally or alternatively, in some embodiments, Zebra Crossing software (see http://code.google.com/p/zxing/) can be used for image processing of barcodes in addition to other functionality applicable to the present disclosure. Additionally or alternatively, in some embodiments, OpenCV software (see http://opencv.willowgarage.com/wiki/) can be used for image processing capabilities such as enhanced edge detection and shape recognition, including Hough Circle Transform, to provide enhanced circle detection within a raw digital image 112.

After pre-processing, the processed digital image 118 is transmitted via network 160 to decoding application 132 at security service 130. Alternatively, in document security system 100 of FIG. 3, the processed digital image 118 is passed to decoding application 332 of smart device 105, or according to some embodiments such as FIG. 5, to local security service 530.

At 414, an image analysis operation is performed of the processed digital image 118 and then the resulting decoded image is passed to the decision processor 134. In some embodiments, using subscriber-specific information in parameters 115, decoding application 132 performs additional image processing to further enhance processed digital images 118 in order to reveal the image of hidden/covert security feature 122 to a greater degree than in the original processed digital images 118. Image data and/or other information relating to the hidden/covert security feature 122 is then passed from decoding application 132 to decision processor 134.

At 416, it is determined whether the information received from decoding application 132 is associated with a hidden/covert security feature 122. If the decoded information sufficiently matches a stored image and/or other data associated with a security feature 122, the document is determined to be a secured physical document 120. Otherwise, the document is determined to be an unsecured physical document 124. For example, if decision processor 134 determines that a hidden/covert security feature 122 is detected, method 400 proceeds to 418. However, if decision processor 134 determines that no hidden/covert security feature 122 is detected, method 400 proceeds to 428 (shown in FIG. 4B).

At 418, the image of the security feature in the decoded image is identified. For example, using decision processor 134, any image data related to hidden/covert security feature 122 detected by decoding application 132 and/or decision processor 134 is compared to information in security feature data 142 in order to identify the hidden/covert security feature 122.

In some cases, the decoded image of the security feature may be processed by an optical character recognition (OCR) module to identify and/or characterize recognizable characters in the decoded image. An example of an OCR engine that may be used is the Tesseract OCR engine, although other OCR engines may be used. For example, the decision processor 134 and/or decoding application 132 may include an OCR module that identifies characters in the decoded image, and then characterizes the security feature 122 on the basis of the identified characters. In some cases, the security feature 122 may include a substantially unique set of characters, and may be associated with a serial number, for example. Examples of patterns (arrays) of characters that may be included in an image are included, by way of example, in FIGS. 12A-12G.

At 420, it is determined whether the secured physical document 120 is authentic. For example, if the data relating to hidden/covert security feature 122 matches a verified hidden/covert security feature in security feature data 142, method 400 proceeds to 422. However, if no match is found in security feature data 142 to the data relating to hidden/covert security feature 122, method 400 proceeds to 434 (shown in FIG. 4C). In some cases, the authenticity of the of the physical document 120 may be determined, at least in part, on the basis of a code (e.g., a serial number) associated with a set of characters included in the image, which characters may be recognized through use of an OCR engine.

At 422, rules are applied for the authenticated security feature and certain actions are determined. For example, decision processor 134 queries rules data 144 of database 140 for rules that apply to the authentic hidden/covert security feature 122 and determines what actions, if any, are to be performed (e.g., transmit a text message to originating smart device 105). Further, the rules that are applied may be subscriber-specific because rules data 144 may include subscriber-specific information.

At 424, actions/instructions are returned to the originating mobile device. The actions/instructions that are returned may be subscriber-specific because rules data 144 may include subscriber-specific information. In one example, security service 130 transmits a text message (e.g., via SMS) to the originating smart device 105, wherein the text message is AUTHENTIC PRODUCT, AUTHENTIC DOCUMENT, VALID-EXPIRED MARK, VALID MARK: INVALID-LOCATION, or similar message based on rules data 144. In another embodiment, security service 130 transmits data directing the smart device to display the enhanced image showing the hidden data in the hidden/covert security feature 122. Additionally or alternatively, this information is combined with information decoded from a barcode or similar image associated with the hidden/covert security feature 122 and/or location information.

At 426, tracking and image information is stored in the database 140. In some embodiments, each record in tracking data 146 includes tracking information for a particular digital image transaction, such as, for example, user ID, device ID, network address, timestamp, etc. Additionally or alternatively, for each record that is created, the image data of the processed digital image 118 and/or the image data of the identified hidden/covert security feature 122 are stored in image data 148 of database 140. Method 400 ends.

At 428 (FIG. 4B), rules are applied for unsecured physical documents and certain actions are determined. For example, decision processor 134 queries rules data 144 of database 140 for rules that apply to unsecured physical documents 124 and determines what actions, if any, are to be performed (e.g., transmit a text message to originating smart device 105). Further, the rules that are applied may be subscriber-specific because rules data 144 may include subscriber-specific information.

At 430, actions/instructions are returned to the originating mobile device. The actions/instructions that are returned may be subscriber-specific because rules data 144 may include subscriber-specific information. In one example, security service 130 transmits a text message (e.g., via SMS) to the originating smart device 105, wherein the text message is UNSECURED DOCUMENT. In another example, the absence of a hidden/covert security feature 122 may indicate a fraudulent or counterfeit product, such as when the product packaging is required to have a security feature to verify authenticity. Therefore, a text message (e.g., via SMS) is transmitted to the originating smart device 105, wherein the text message is COUNTERFEIT PRODUCT. Further, security service 130 optionally transmits a message to a law enforcement agency or other authoritative entity, which are third-party services 150.

At 432, tracking and image information is stored in the database. For example, a record is created in tracking data 146 that includes, for example, user ID, device ID, network address, and timestamp. Additionally, for the record that is created, the image data of the processed digital image 118 is stored in image data 148 of database 140. Method 400 ends.

At 434 (FIG. 4C), rules are applied for counterfeit physical documents and certain actions are determined. For example, decision processor 134 queries rules data 144 of database 140 for rules that apply to the counterfeit secured physical document 120 and determines what actions, if any, are to be performed (e.g., transmit certain text message to originating smart device 105 and transmit message to law enforcement). Further, the rules that are applied may be subscriber-specific because rules data 144 may include subscriber-specific information.

At 436, actions/instructions are returned to the originating mobile device. The actions/instructions that are returned may be subscriber-specific because rules data 144 may include subscriber-specific information. In one example, security service 130 transmits a text message (e.g., via SMS) to the originating smart device 105, wherein the text messages is COUNTERFEIT DOCUMENT. Further, security service 130 optionally transmits a message to a law enforcement agency or other authoritative entity, which are third third-party services 150.

At 438, tracking and image information is stored in the database 140. For example, a record is created in tracking data 146 that includes, for example, user ID, device ID, device location, and timestamp. Additionally, for the record that is created, the image data of the processed digital image 118 and/or the identified hidden/covert security feature 122 are stored in image data 148 of database 140. Method 400 ends.

Figure 5:
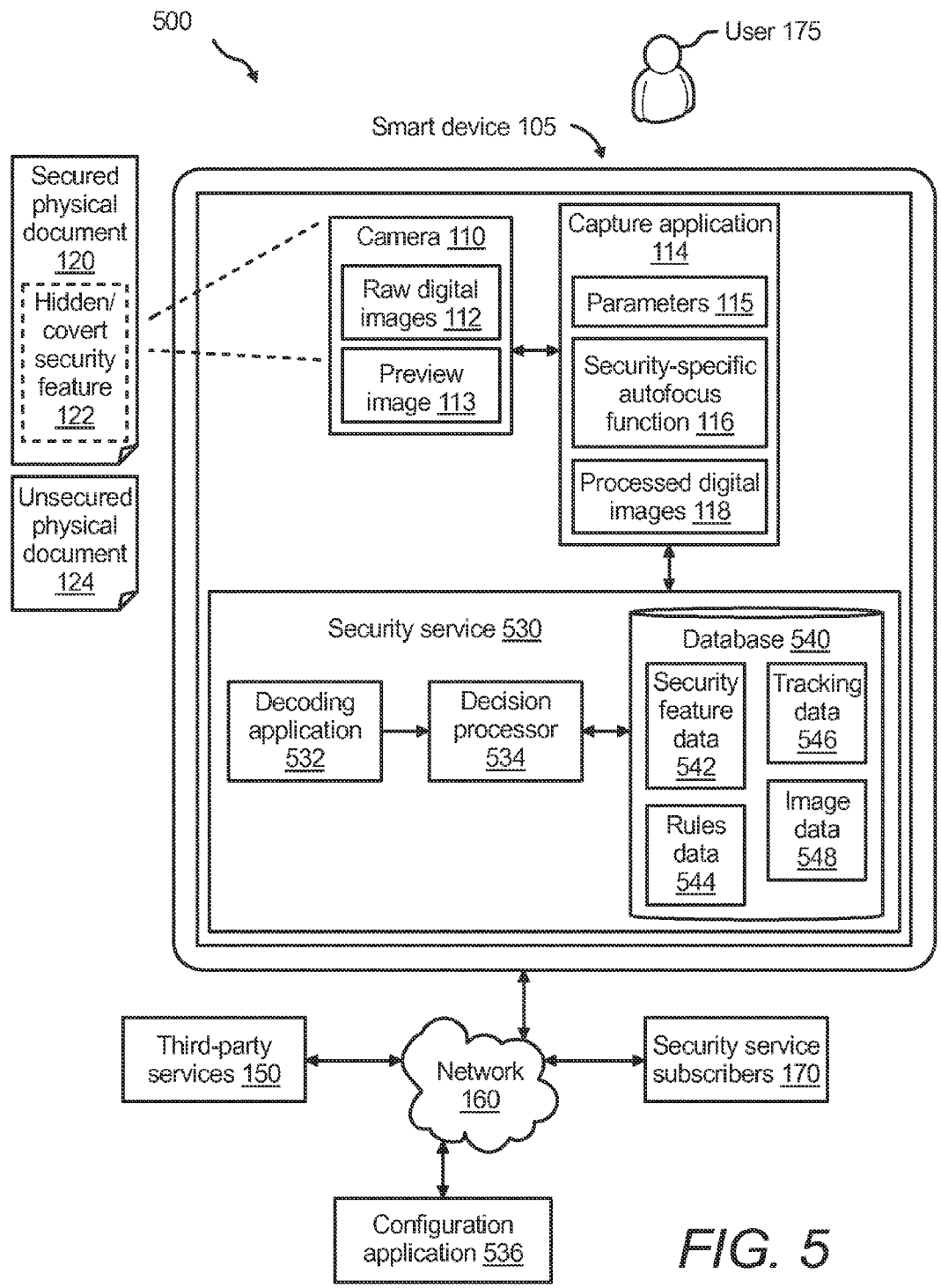
FIG. 5 illustrates a system for providing security feature detection and authentication using a smart device, where the database with security feature data and related information is provided on the smart device, according to an embodiment of the present disclosure.

Turning to FIG. 5, a system configuration is illustrated wherein information in the database 540 is stored directly on the smart device 105, according to an alternative embodiment of the present disclosure. Similar to system configurations previously discussed, system 500 comprises a smart device 105 which has camera 110 and capture application 114 which allow for capture and preprocessing of an image potentially containing data relating to a hidden/covert security feature 122 substantially as discussed above. But, according to an embodiment of system 500, instead of sending processed digital images 118 over a network 160 to a cloud-based security service 130, a security service 530 is provided locally on the smart device 105. Thus, the capture application 114 is communicatively coupled with the security service 530, and data relating to the processed digital images 118, along with other data potentially required by security service 530 (such as, for example, parameter data 115) is communicated to the security service 530.

In some embodiments, security service 530 comprises a decoding application 532, decision processor 534, and database 540. Database 540 comprises security feature data 542, rules data 544, tracking data 546, and image data 548. According to some embodiments, security service 530 is communicatively coupled, via network 160, to configuration application 536, third-party services 150, and/or security service subscribers 170.

The functionality of security service 530 is similar to the security service 130 described in relation to system 100, with the exception that the security service 530 is provided directly on smart device 105. For example, according to some embodiments, if an acceptable original raw digital image 112 is obtained from of a secured physical document 120, decoding application 532 detects information related to a hidden/covert security feature 122 embedded therein according to parameters 115 and/or processed digital images 118. Accordingly, decoding application 532 passes data relating to the detected hidden/covert security feature 122 to a decision processor 534 of security service 530. In order to evaluate the data from decoding application 532, decision processor 534 queries a database 540 of security service 530. Stored in database 540 are, for example, security feature data 542, rules data 544, tracking data 546, and image data 548.

According to some embodiments, security feature data 542 includes a record of unique hidden/covert security features 122 that have been verified as authentic. Additionally, security feature data 542 may include a record of hidden/covert security features 122 that have been identified as counterfeit. Like parameters 115, the information in security feature data 142 may be subscriber-specific. Using decision processor 534, the image data associated with a hidden/covert security feature 122 detected by decoding application 532 is compared to information in security feature data 542 in order to uniquely identify and/or verify the associated hidden/covert security feature 122. According to some embodiments, there are unique identifying marks, data, and the like in hidden/covert security features 122 so that the data from hidden/covert security features 122 can be properly associated with additional metadata upon lookup on the security service 530.

Once the data relating to hidden/covert security feature 122 has been verified, decision processor 534 queries rules data 544 for information about actions to be taken. The information in rules data 544 may be subscriber-specific. In one example, rules data 544 may indicate a message to be displayed on the smart device 105. According to some embodiments, rules data 544 may indicate that selected image data from secured physical document 120 be displayed on the smart device 105, such as, for example, the enhanced image data allowing the image associated with hidden/covert security feature 122 to be easily viewed with the unaided eye. According to some embodiments, rules data 544 may indicate to provide messages as to the authenticity of the document 120 or 124, and/or engage network based third-party services 150 as described in regards to FIG. 1, above.

According to some embodiments, tracking data 546 of database 540 of security service 530 includes records of all processed digital images 118 that are received and processed by smart device 105 via security service 130. In some embodiments, each record in tracking data 546 includes tracking information for a particular digital image transaction, such as, for example, user ID, device ID, network address, timestamp, etc. Additionally, for each record in tracking data 546, the image data of the processed digital image 118 itself and/or other data relating to the hidden/covert security feature 122 may be stored for auditing purposes in image data 548 of database 540.

According to some embodiments, configuration application 536, which is an optional component of security service 530, is an administrator tool that is used to configure and/or adjust information in database 540 relating to security feature data 542, rules data 544, tracking data 546, and image data 548. According to some embodiments, configuration application 536 communicates with database 540 via network 160, allowing for a centralized control and/or administration of data in database 540. In some embodiments, configuration application 536 includes data relating to pattern recognition, void marks, expired marks, and/or other administrative information. For example, when information is available regarding a counterfeit hidden/covert security feature 122, the configuration application 536 may communicate with database 540 to provide image data and processing rules related to the counterfeit security feature.

Document security system 500 provides the capability to maintain a security service 530 directly on the smart device 105, which is desirable for applications requiring, for example, enhanced security. According to some embodiments, the image data and/or parameters relating to hidden/covert security feature 122 are not sent over a network and therefore are less susceptible to unintended or fraudulent access, e.g. hacking. Thus, system 500 provides a document analysis and authentication solution for environments where a network is not immediately available and/or it is undesirable to communicate certain data over a network, such as for systems used by customs personnel that are required to meet specific security protocols.

In some embodiments, the security service 530 on smart device 105 is not directly accessible to a user 175 of smart device 105 and/or is only configurable via configuration application 536. According to some embodiments, security service subscribers 170 and/or third-party services 150 are configured to push updated information to database 540 via network 160. In some embodiments, when certain hidden/covert security features 122 are changed or new hidden/covert security features 122 are created, the database 540 is updated thereby affecting how secured physical documents 120 are serviced by smart device 105 in the future. According to some embodiments, individual or aggregate data collected by database 540 is periodically communicated to third-party services 150, security service subscriber 170 and/or configuration application 536.

In FIG. 6, an example pattern (a "four-corner triangle" pattern) is disclosed, showing the relative spacing used for the elements 601-612 of the pattern. The pattern of FIG. 6 is an example embodiment of a pattern used during the focus process and optionally to convey additional information via data lookups in the database (140 or 540) and/or via the network 160. The pattern embedded in the hidden security feature comprises a pre-determined, variable pattern of shapes (in FIG. 6, circles 601-612 are shown as an example, but other shapes may be used). The pattern may be generated using mathematical processes, such as vector algebra or pattern calculus. In some embodiments, information relating to the structure of the pattern such as shown in FIG. 6 can be stored in parameters 115, and that information is used when analyzing the pattern to determine authenticity. According to some embodiments, when analyzing an image containing a pattern such as shown in FIG. 6, the application operating on the smart device 105—e.g. capture application 114—recognizes the mathematically generated pattern by reversing the formula (s) used to generate the pattern. The pattern recognition capabilities of the capture application 114 can then be used to establish the focal length, authenticate the pattern, and/or perform lookups based on the data in a local or network database.

In FIG. 6, an X and Y axis are illustrated to illustrate the positioning of elements 601-612 according to commonly used graphical nomenclature. According to the embodiment of FIG. 6, the elements 601-612 are arranged according to the relative positioning and spacing described below and illustrated in FIG. 6 to create the four-corner triangle pattern. Elements 601-612 are depicted as circles in the illustrated embodiment, although as discussed below (e.g. FIG. 10A-10G) many other shapes and configurations are permissible.

In FIG. 6, each element has the following relative horizontal positioning:

Element 601, 602, 603 and 604 have the same positioning on the X-axis Element 605 and 612 have the same positioning on the X-axis Element 606 and 611 have the same positioning on the X-axis Element 607, 608, 609, and 610 have the same positioning on the X-axis In FIG. 6, each element has the following relative vertical positioning:

Element 601, 612, 611, and 610 have the same positioning on the Y-axis Element 602 and 609 have the same positioning on the Y-axis Element 603 and 608 have the same positioning on the Y-axis Element 604, 605, 606, and 607 have the same positioning on the Y-axis Additionally, the relative spacing between elements of each corner of the pattern is uniform. For example, the spacing between element 601 and 612 is approximately the same as the spacing between elements 601 and 602. In some embodiments, the spacing between the elements in a corner grouping is approximately 40 pixels. Furthermore, the relative spacing between corner groups is uniform, for example, the distance from element 601 to 610 is approximately the same as the distance from element 604 to 607, from 601 to 604, or from 610 to 607. According to some embodiments, additional textual and/or data can be added inside the four corners of the pattern. According to some embodiments, the thickness of the line denoting the circle in elements 601-612 is at least approximately $\frac{1}{8}^{th}$ inch thick.

According to some embodiments, the pattern of FIG. 6 or similar pattern is concealed within the hidden/covert security feature 122, using previously described security features such as Prism™, Veriglow™, and/or other security features. The pattern may be positioned such that it is adjacent to, surrounding or otherwise in close proximity to additional image and/or text information. In some embodiments, the additional image information is a one dimensional barcode (UPC), two dimensional barcode (for example, QR, data matrix, PDF417, or Aztec), or other image information. Examples of the combination of a barcode with a pattern and additional hidden text are illustrated in FIG. 9A-9D.

In some embodiments, the pattern is screened to match the hidden/covert security feature 122. According to some embodiments, the hidden/covert security feature 122 contains the phrase "VALID" or similar language to indicate the authenticity of a barcode or other image adjacent to the hidden/covert security feature 122. In some embodiments, red dots over black pantograph is used as the hidden/covert security feature 122 to conceal the "VALID" text, or similar language, as the red dots camouflage the black pantograph. Accordingly, once the text is revealed according to the authentication process, the smart device may report the authentication of the barcode, along with inventory information or other information contained via reading the barcode.

Turning to FIGS. 7A-7D, several example configurations containing target patterns, barcodes and additional text (shown as "TEXT HERE" to be replaced by the desired text for a particular document and/or product, such as brand information associated with particular product or additional security information) are shown on the left of each FIG. 7A-7D, alongside data reported for that configuration on the right side of the arrow in each of FIG. 7A-7D. In some embodiments, some or all of the data reported is obtained from a database lookup based on information contained in the pattern and/or associated text information and image. As an example, a customer may choose to use a certain configuration for all deliveries to the United States (such as the configuration shown on the left side of FIG. 7A), and another type of configuration for all deliveries to Mexico (such as the configuration shown on the left side of FIG. 7B). Thus, the pattern recognition capability in combination with the database lookup will confirm the destination country based on the configuration information. Similarly, city, state, date, and other tracking information can be associated with and accessed via the pattern and/or text embedded in the hidden/covert security feature 122. This tracking information can be combined with information based on barcoded information, such as a QR code, data matrix, PDF417, Aztec, UPC code, or other indicia, to allow for an additional level of verification, for example, by duplicating certain barcode information in the pattern and checking for data consistency.

Figure 7A:
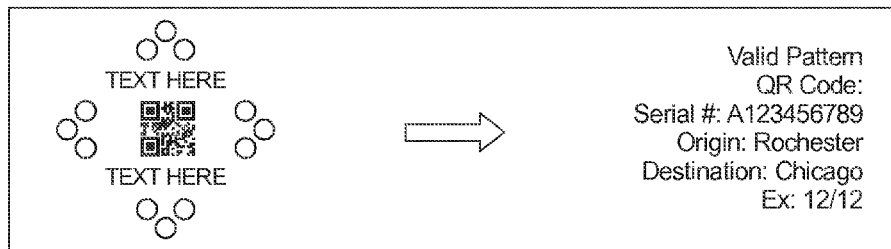
FIG. 7A illustrates an example image and the results displayed upon analysis of the image, according to an embodiment of the present disclosure.

In FIG. 7A, the configuration shown on the left side of the figure includes a target pattern, textual information, and a two dimensional bar code. According to some embodiments, when the data related to configuration shown in FIG. 7A is processed—e.g. by capture application 114 and/or decoding application 132—the application recognizes a mathematically generated pattern used to prepare the pattern by reversing the formula (s) used to generate the pattern. In some embodiments, the mathematical information used to generate the pattern corresponds to a unique index, and that unique index is used to perform a lookup for corresponding data in database 140. Thus, database 140 can provide any desired information about the particular document such as its origin, destination, expiration date, etc. In FIG. 7A, the database lookup has provided the origin information (Rochester), destination information (Chicago), and expiration date (December 2012). In FIG. 7A, this information is combined with the information provided by the barcode (identified as a QR code with a serial number as shown) and validity information based on information provided by decision processor 134, to provide a complete set of status and authentication information to user 175. Note that, in some embodiments, information from the database lookup can be analyzed in combination with information from other sources, such as GPS information, data from bar code information, textual data embedded in the hidden/covert security feature 122, and other information in order to check for consistency and to provide multi-level verification capability. Example arrangements of characters/symbols that are associated with customizable identifiers (e.g., serial numbers) according to a decoder pattern are described further herein in connection with FIGS. 11A-11D below. Moreover, example arrangements of characters/symbols that may be included in a security feature are described further in connection with FIGS. 12A-12G. For example, an arrangement of characters/symbols in the security feature may be recognized via an OCR module, and the recognized arrangement of characters can then be associated with a substantially unique identifier such as a serial number. The association between the pattern of characters/symbols and the serial number may be based on the particular recognized characters and/or the relative locations of the characters, and may be completed in accordance with a lookup table, for example.

Figure 7B:
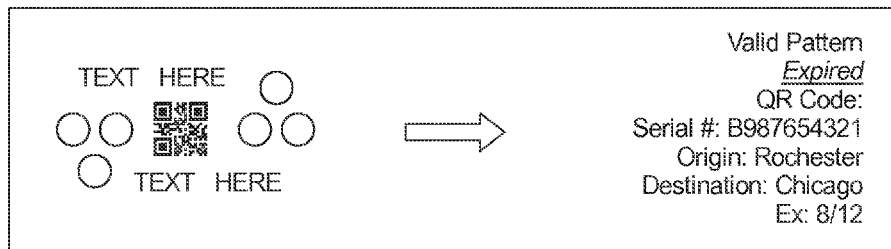
FIG. 7B illustrates another example image and the results displayed upon analysis of the image, according to an embodiment of the present disclosure.
Figure 7C:
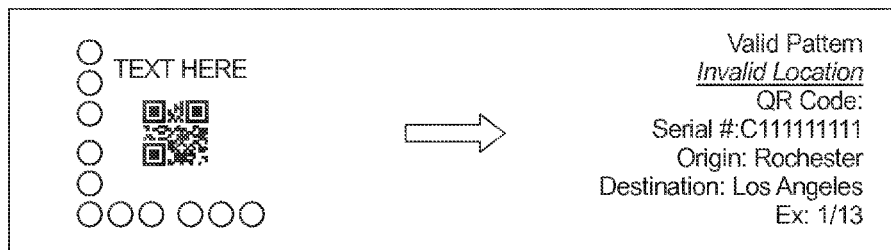
FIG. 7C illustrates another example image and the results displayed upon analysis of the image, according to an embodiment of the present disclosure.
Figure 7D:
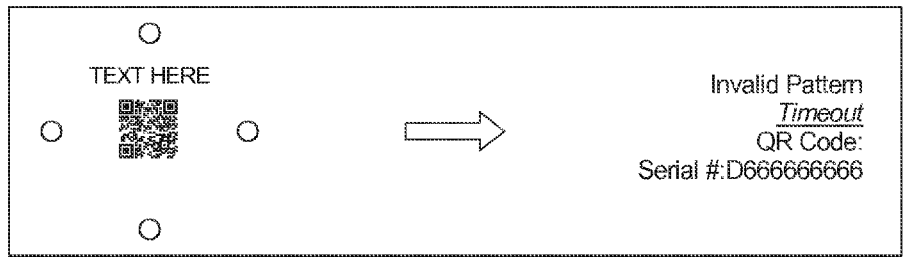
FIG. 7D illustrates another example image and the results displayed upon analysis of the image, according to an embodiment of the present disclosure.

In FIGS. 7B-7D, examples of alternative configurations and reported data relating to those configurations are provided. In FIG. 7B, information received from database 140 based on the configuration on the left of FIG. 7B identifies an expiration date of August 2012, and therefore the result is reported as "Expired." An alternative example is shown in FIG. 7C, wherein the destination location of Los Angeles is identified as an "Invalid Location." In FIG. 7D, the hidden/covert security feature 122 was not successfully read and the results report "Timeout" along with the barcode information only, as no database lookup could be performed on the image data related to the hidden/covert security feature 122. FIGS. 7A-7D are provided as examples of potential configurations and resulting reported data, and are not intended to be exhaustive, as the information retrieved from database 140 based on the data lookup is configurable, and additional reporting options are also configurable based on rules data 144.

In some embodiments, in addition to capturing information relating to the hidden/covert security feature 122, the capture application 114 will also interact with the Global Positioning System (GPS) capabilities of the smart device to determine and record the location of the smart device at the time of the capture process. Location information can then be locally stored on the smart device and/or provided to the network 160 for further use, such as storing location data as part of tracking data 146 in database 140.

In some embodiments, the smart device allows for additional data to be received from a user and/or for information to be sent by a user (for example, via email or text message) after the capture/decode process. Additionally or alternatively, the smart device allows for storage of the enhanced image revealing the hidden security information. In some embodiments, these user functions are only enabled after verification of the authenticity of the hidden/covert security feature 122 and/or confirmation of additional permissions according to security service subscriber 170. According to some embodiments, successful authentication of the document allows for printing of a second document (e.g. a ticket) or display of a corresponding image on the smart device.

Figure 8B:
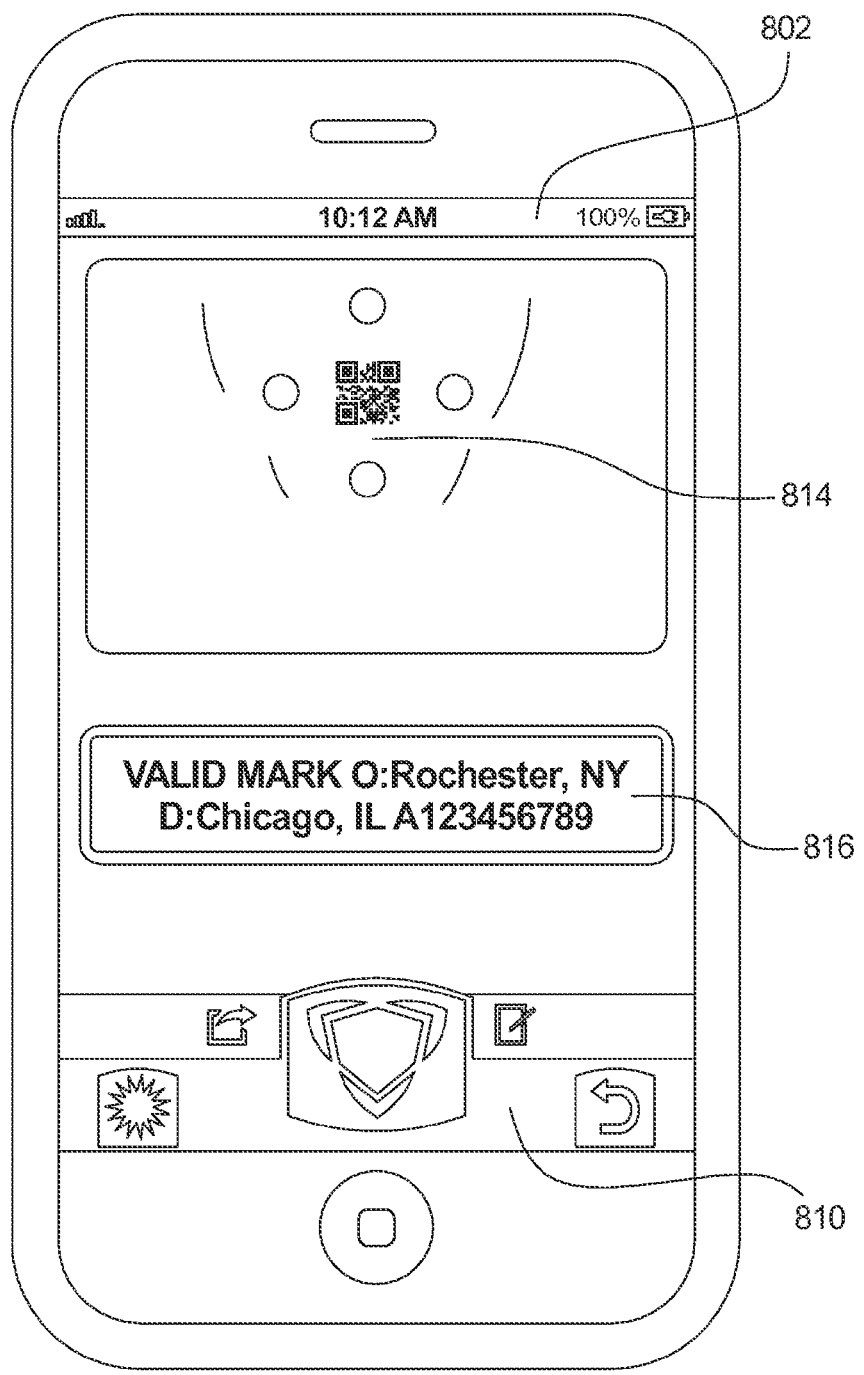
FIG. 8B illustrates another display screen of the example authentication application shown in FIG. 8A during reporting of a successful authentication, according to an embodiment of the present disclosure.

In FIGS. 8A-8C, an example embodiment of the disclosure is illustrated on a smart device 105. In the embodiment shown in FIGS. 8A-8C, the smart device 105 is a smart phone. In FIG. 8A, a display screen on the smart device 105 corresponding to the image capture process is illustrated. In FIG. 8A, smart device 105 displays phone status information 802, application status information 804, settings information 806, exposure control 808, input buttons 810, and a targeted image 812. Phone status information 802 displays general information about the phone such as signal strength and battery life. Application status information 804 displays specific status information for the capture application 114, such as scanning status or other diagnostic information. Settings information 806 displays information corresponding to specific application settings, such as 2D barcode detection, Prism feature detection, video stabilization, and other configurable settings. Exposure control 808 can be adjusted to compensate for varied photography environments. Input buttons 810 allow for adjustment of configurable application settings, image capture, and other inputs to the capture application 114 and/or smart device 105. Targeted image 812 shows a preview image 113 of the region targeted by camera 110, showing the image which will be captured once the appropriate input button 810 is selected.

FIG. 8B illustrates a reporting of a successful authentication, according to an embodiment of the present disclosure. FIG. 8B includes phone status information 802, decoded image 814, results field 816, and input buttons 810. Decoded image 814 provides an enhanced image, based on hidden/covert security feature 122, such that the hidden pattern and/or textual information is visible to the unaided eye. Results field 816 provides results associated with the authentication process and/or database lookup information corresponding to hidden/covert security feature 122. Additionally or alternatively, results field 816 displays information related to a barcode or other image information positioned adjacent to hidden/covert security feature 122. Examples of data reported in results field 816 were discussed above in relation to FIGS. 7A-7D.

FIG. 8C illustrates the reporting of a timeout, which may occur when the hidden/covert security feature 122 cannot be detected by capture application 114. FIG. 8C includes phone status information 802, decoded image 814, results field 816, and input buttons 810 similar to FIG. 8B. However, in FIG. 8C no image data is provided at 814, and the results field 816 provides a message indicating that a timeout occurred.

Figure 10A:
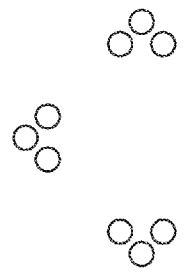
FIG. 10A illustrates an example hidden target pattern, according to embodiments of the present disclosure.
Figure 10B:
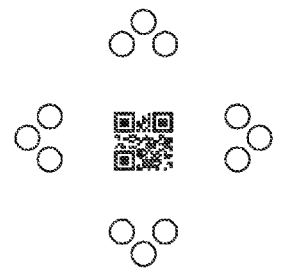
FIG. 10B illustrates an example hidden target pattern associated with a QR code, according to embodiments of the present disclosure.
Figure 10C:
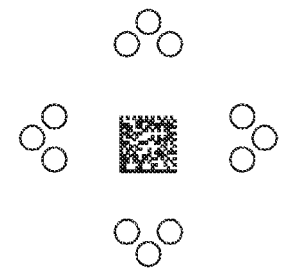
FIG. 10C illustrates an example hidden target pattern associated with a data matrix, according to embodiments of the present disclosure.
Figure 10D:
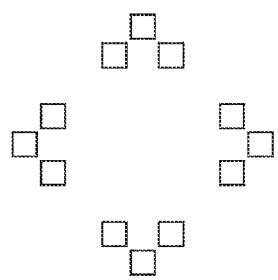
FIG. 10D illustrates an example hidden target pattern including squares, according to embodiments of the present disclosure.
Figure 10E:
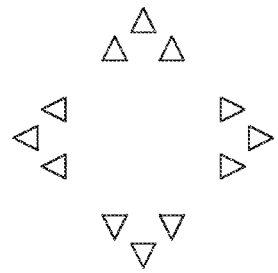
FIG. 10E illustrates an example hidden target pattern including triangles, according to embodiments of the present disclosure.
Figure 10F:
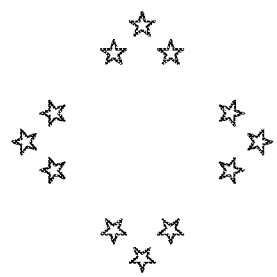
FIG. 10F illustrates an example hidden target pattern including stars, according to embodiments of the present disclosure.
Figure 10G:
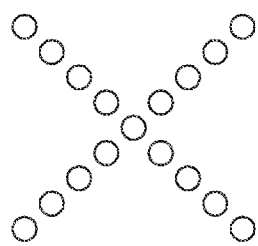
FIG. 10G illustrates an example hidden target pattern in an alternative configuration, according to embodiments of the present disclosure.

Turning to FIGS. 9A-D, the components of several example hidden/covert security features 122 and associated images within a secured physical document 120 are shown. Four examples are shown, each image comprising a code 902A-D, a hidden optical target pattern 904A-D, hidden textual information 906A-D, and a background tint 908A-D which conceals the optical target pattern and textual information. These components are combined to create the final image as shown in 910A-D. Thus, in the embodiments shown in FIG. 9A-D, the code is surrounded by the hidden/covert security feature 122 comprising optical targets and textual information. Note that for illustrative purposes the final images 910A-D are enhanced to show the text and pattern within the background tint, but in the actual hidden/covert security feature 122 the pattern and text would not be visible to the unaided eye (but any image adjacent to the hidden/covert security feature 122, such as the bar code shown in 910A-D, will be visible to the naked eye). The optical target patterns and positioning of textual information are not limited to the configurations shown here, but rather the patterns provided are examples of potential configurations. Similarly, while the embodiments here include code 902A-D, a code is not required, as the hidden/covert security feature 122 may be associated with other image information, or may be provided by itself without an additional image or text. As an example, as shown in FIGS. 10A-10C, the pattern may be associated with no image whatsoever as in FIG. 10A, a QR code as in FIG. 10B, a data matrix as in FIG. 10C, or any other image or textual information as desired by a particular security service subscriber 170. Additionally, while example embodiments of patterns disclosed herein have used circles to construct the pattern, the disclosure is not so limited. As shown in FIG. 10D-10F, the pattern may be comprised of squares (FIG. 10D), triangles (FIG. 10E), stars (FIG. 10F), or a variety of other elements. Furthermore, the pattern may be presented in a variety of configurations; one such alternative configuration is shown in FIG. 10G.

FIGS. 11A-11D illustrate examples in which a serial number is extracted from a pattern of hidden characters using a corresponding decoder, according to embodiments of the present disclosure. As shown in FIGS. 11A and 11B an array of characters and/or symbols can be arranged with guide elements serving as a key (FIG. 11A). The key elements can be analogous to the pattern shown in FIG. 6 that is used for focusing the capture application 114. Additionally or alternatively, the key elements (non-shaded region in FIG. 11A) can be used, during pattern recognition processing, to identify an orientation and/or boundary of the remainder of the coded pattern elements (non-shaded region of FIG. 11B). Thus, the key elements may be arranged proximate the corners of the coded area so as to define the boundaries of the coded area. As described in connection with FIGS. 11C and 11D, the key elements may also be associated with a particular decoder (e.g., the type, number, and/or position(s) of the elements in the key may be used to define a particular decoder for a coded pattern).

FIG. 11C illustrates an example of a 3 by 3 coded pattern that defines a serial number according to a decoder. The example 3 by 3 pattern includes the array shown in left-most box of FIG. 11C in all areas other than the top row and left-most column, which are reserved for the key, similar to the key shown in FIG. 11A. The example 3 by 3 coded pattern thus includes a top row with two blanks ("spaces") followed by a circle; a middle row with two circles followed by a space; and a bottom row with two circles followed by a space. Each entry in the coded pattern can then be associated with a corresponding entry in a decoder table. FIG. 11C also includes an illustration of an example decoder with entries A1, A2, A3, B1, B2, B3, C1, C2, C3. The decoder can then be combined with the coded pattern to generate a serial number. A serial number can be generate by concatenating a string of values that combines the entries in the coded pattern with the entries in the decoder. For example, as shown in FIG. 11C, array locations of the coded pattern populated with a space can correspond to "S" and the array locations populated with a circle can correspond to "C." An "S" or "C" for each entry in the coded pattern can then be concatenated with an entry in a corresponding location of the decoder (e.g., A1 for the top-left location; C3 for the bottom-right location, etc.). The serial number generated may thus be: SA1SA2CA3CB1CB2SB3CC1CC2SC3.

FIG. 11D illustrates an example of a 3 by 4 coded pattern that defines a serial number according to a decoder. The example 3 by 4 pattern includes the array shown in the left-most box of FIG. 11D in all areas other than the top row and left-most column, which are reserved for the key, analogous to the key shown in FIG. 11A. Each entry in the coded pattern can then be associated with a corresponding entry in a decoder table, which is shown in the middle box of FIG. 11D. The example 3 by 4 coded pattern thus includes a top row with a circle followed by three spaces; a middle row with two spaces, followed by a circle, followed by a space; and a bottom row with two circles followed by two spaces. FIG. 11D also includes an illustration of an example decoder with entries PP, d1, 2w, o %, etc. The decoder can then be combined with the 3 by 4 coded pattern to generate a serial number (e.g., by concatenating a string of values that combines the entries in the coded pattern with the entries in the decoder). For example, as shown in FIG. 11D, array locations of the coded pattern populated with a space can correspond to "!1" and the array locations populated with a circle can correspond to "3#." Each entry in the coded pattern can then be concatenated with an entry in a corresponding location of the decoder, similar to the discussion of FIG. 11C above. The serial number generated may thus be: 3#PP!1d1!12w!1o%!1vC!1553#?#!1Gb3#aS3#br!16%!1p0.

In the example shown in FIG. 11C, the total number of unique combinations is given by the number of possible entries in each array location of the coded pattern raised to the power of the number of array locations. For two possible entries in each location (e.g., either a circle "C" or a space "S"), and nine total array locations, there are $2^9$=512 possible combinations. However, by adding another possible entry (e.g., a triangle, star, cross, alphanumeric character, etc.) the number of possible combinations becomes $3^9$=19,683; and by adding a fourth possible entry, the number of possible combinations becomes $4^9$=262,144. Similarly, for the example shown in FIG. 11D with a coded pattern arranged in a 3 by 4 array, a pattern with two possible entries has $2^{12}$=4096 possible combinations; three possible entries provides $3^{12}$=531,441 possible combinations; and four possible entries provides $4^{12}$=16,777,216 possible combinations.

Although, it is noted that the above description of FIG. 11 is just one example of a coded pattern combined with a decoder to generate a serial number, and other arrangements may be used. Generally, the present disclosure provides for a camera-equipped smart device to capture an image of a security feature that may include an encoded pattern, which may not be readily apparent to the naked eye. The image processing techniques on the smart device and/or remote server can then be used to decode the image and characterize the security feature and thereby authenticate the imaged document, such as discussed in connection with FIGS. 1-5 and elsewhere herein. Once decoded via the image processing software, the security feature may include patterns that can be mapped to substantially unique identifiers in order to enable tracking of the particular pattern. Moreover, some embodiments of the present disclosure also provide for generating such security patterns to include substantially unique, dynamically generated identifiers such as the coded patterns discussed above, for example. When incorporated on product packaging, for example, particular products can then be scanned at a future time and information particular to that product (e.g., batch identifier, manufacture date, shipping date, sale date, etc.) can be retrieved from a remote server on the basis of the substantially unique identifier. Accordingly, some embodiments of the present disclosure provide for dynamically generating security patterns to be printed on a series of items such that each resulting item (or perhaps groups of such items) are printed with a substantially unique identifier included in the security pattern in a manner that can be distinguished through the image processing techniques included herein.

FIGS. 12A-12G illustrate example configurations for patterns of characters to be embedded in security feature, according to embodiments of the present disclosure. As shown in FIGS. 12A-12G characters may be arranged in arrays and optionally surrounded by orienting features. For example, 12A illustrates an arrangement of alphanumeric characters (e.g., the numbers 1-9) situated near the corner-marking key elements which are shown as three lower-case x letters. Although the key elements may be omitted and/or the alphanumeric characters may include letters as well as numbers (FIG. 12B). Moreover, as shown in FIG. 12A-12C the character pattern may be arranged to be wholly or partially within an orienting shape, such as the rounded shapes shown in FIGS. 12A-12B or the box shown in FIG. 12C, for example. Further, the array of alphanumeric characters is not limited to 3 by 3 arrays, and may include arrays (or other arrangements) of a variety of shapes and dimensions. For instance, a 2 by 5 array of alphanumeric characters may be used, as shown in FIG. 12D, or a 5 by 2 array of such characters, as shown in FIG. 12E. Still further, FIG. 12F shows a 3 by 4 array. In addition, the arrangement of alphanumeric characters may be arranged in non-rectangular shapes, such as the arrangement configured to spell out the letters "D S S," as shown in FIG. 12H, or other arbitrarily shapes/configurations. Generally, such arrangements of alphanumeric characters may include any static OCR language library, such that the characters can be identified and recognized by an OCR engine. FIG. 12G is an example of an array populated non-latin alphanumeric characters.

According to some embodiments, elements of this disclosure may be used to authenticate a variety of documents and related products, including but not limited to the following: protection/secondary authentication of product codes on product packaging (such as verification of destination country for pharmaceutical products), authentication of unique or expensive goods (such as signed memorabilia), control of imports/exports (such as for luxury goods commonly counterfeited), warehouse management and tracking (such as the destination information and expiration date of perishable items), authentication of important documents such as ID cards or title documents, verification of promotional materials or gaming tickets, identification of product recalls, and many other applications relying on the authentication, via a smart device, of hidden security information within a document.

Many functions described herein may be implemented in hardware, firmware, or software. Further, software descriptions of the disclosure can be used to produce hardware and/or firmware implementing the disclosed embodiments. According to some embodiments, software and/or firmware may be embodied on any known non-transitory computer-readable medium having embodied therein a computer program for storing data. In the context of this disclosure, computer-readable storage may be any tangible medium that can contain or store data for use by, or in connection with, an instruction execution system, apparatus, or device. For example, a non-volatile computer-readable medium may store software and/or firmware program logic executable by a processor to achieve one or more of the functions described herein in connection with FIGS. 1-12. Computer-readable storage may be, for example, an electronic, magnetic, optical, electromagnetic, infrared, or semiconductor system, apparatus, or device, or any suitable combination of the foregoing. More specific examples of computer-readable storage would include but are not limited to the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Further, although aspects of the present disclosure have been described herein in the context of a particular implementation in a particular environment for a particular purpose, those of ordinary skill in the art will recognize that its usefulness is not limited thereto and that the present disclosure can be beneficially implemented in any number of environments for any number of purposes.

In view of the exemplary systems described above, methodologies that may be implemented in accordance with the described subject matter will be better appreciated with reference to the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies described in this disclosure are capable of being stored on an article of manufacture to facilitate transporting and transferring such methodologies to computing devices.

Although some of various drawings illustrate a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

What is claimed is:

1. A system for authenticating at least one hidden security feature, the system comprising:
   a secure physical document with at least one hidden security feature; and
   a smart device comprising a processor, a camera, a capture application, and a security service;
   wherein the camera captures image information corresponding to the at least one hidden security feature to be authenticated, the capture application performs processing, via the processor, and based on a set of subscriber specific parameters manipulates at least one of the camera's image capture characteristics and predetermined effects at time of image capture to generate a processed digital image containing image data corresponding to the hidden security feature;

wherein the capture application adjusts the focus of the camera to capture a preview image of hidden security feature to be authenticated, the camera communicates the preview image to the capture application, and the capture application filters the preview image to optically reveal the hidden security feature to be authenticated;

wherein the capture application communicates data to the camera to adjust focus and generate a second preview image; and wherein the security service receives the processed digital image containing image data corresponding to the hidden security feature from the capture application, processes, via the processor, the processed digital image containing image data corresponding to the hidden security feature, and sends data to the smart device indicating the authenticity of the processed digital image containing image data corresponding to the hidden security feature.

2. The system of claim 1, wherein the at least one hidden security feature comprises a hidden target pattern.

3. The system of claim 2, wherein the at least one hidden security feature comprises hidden textual information.

4. The system of claim 2, wherein the camera communicates with a security-specific autofocus function, the security-specific autofocus function analyzing image data corresponding to the hidden target pattern.

5. The system of claim 1, wherein the hidden security feature is accomplished using PRISM security technology.

6. The system of claim 1, wherein the hidden security feature is accomplished using VERIGLOW security technology.

7. The system of claim 1, wherein the hidden security feature is adjacent to a barcode.

8. The system of claim 7, wherein the barcode is a two-dimensional barcode.

9. The system of claim 8, wherein the barcode is one of a QR code, data matrix, PDF417, or Aztec.

10. The system of claim 1, wherein the security service comprises a database, the database comprising security feature data, rules data, tracking data, and image data.

11. A system for authenticating documents, the system comprising:

a document comprising hidden data to be authenticated;

a smart device comprising a processor, a camera, and a capture application wherein the capture application manipulates at least one of the camera's image capture characteristics and predetermined effects at time of image capture based on a set of subscriber specific parameters; and a security service communicatively coupled to the smart device;

wherein the capture application adjusts the focus of the camera and captures a preview image of hidden data to be authenticated, the camera communicates the preview image to the capture application, and the capture application filters the preview image to optically reveal the hidden data to be authenticated;

wherein the capture application communicates data to the camera to adjust focus and generate a second preview image.

12. The system of claim 11, wherein the hidden data to be authenticated comprises a preferred focus pattern.

13. The system of claim 11, wherein the document comprises a barcode, and the barcode is positioned such that the hidden data to be authenticated is adjacent to a barcode.

14. The system of claim 13, wherein the hidden data substantially surrounds the barcode.

15. A method of authenticating a hidden security feature using a smart device, the smart device comprising a display, a camera and a security application, the method comprising:

capturing, via the camera and a capture application, an image of a hidden security feature wherein the capture application manipulates at least one of the camera's image capture characteristics and predetermined effects at time of image capture based on a set of subscriber specific parameters; and wherein the capture application adjusts the focus of the camera to capture a preview image of hidden security feature to be authenticated, the camera communicates the preview image to the capture application, and the capture application filters the preview image to optically reveal the hidden security feature to be authenticated;

wherein the capture application communicates data to the camera to adjust focus and generate a second preview image;

processing, via the security application, the image to create a processed image;

communicating the processed image to a security server, the security server comprising a decision processor and a database, the database comprising security feature data;

determining, via the decision processor and according to the security feature data, the authenticity of the processed image and generating corresponding authenticity information;

communicating the authenticity information to the capture application; and, displaying the authenticity information on the display of the smart device.

16. The method of claim 15, wherein the target pattern and text are hidden using VERIGLOW security technology.

17. The method of claim 14, wherein the hidden security feature comprises a target pattern and text.

18. The system of claim 13, wherein the hidden data is contained within the barcode.

19. The method of claim 15, wherein the target pattern and text are hidden using PRISM security technology.

* * * * *